United States Patent
Levesque

(10) Patent No.: US 11,121,785 B2
(45) Date of Patent: Sep. 14, 2021

(54) DETECTION AND TRACKING OF INTERFERERS IN A RF SPECTRUM WITH MULTI-LANE PROCESSING

(71) Applicant: EXFO Inc., Quebec (CA)

(72) Inventor: Martin Levesque, L'lle-Bizard (CA)

(73) Assignee: EXFO Inc., Quebec (CA)

(*) Notice: Subject to any disclaimer, the term of this patent is extended or adjusted under 35 U.S.C. 154(b) by 111 days.

(21) Appl. No.: 16/738,258

(22) Filed: Jan. 9, 2020

(65) Prior Publication Data
US 2020/0252144 A1 Aug. 6, 2020

Related U.S. Application Data

(60) Provisional application No. 62/790,560, filed on Jan. 10, 2019, provisional application No. 62/818,935, filed on Mar. 15, 2019.

(51) Int. Cl.
*H04B 17/345* (2015.01)
*H04W 24/08* (2009.01)

(52) U.S. Cl.
CPC .......... *H04B 17/345* (2015.01); *H04W 24/08* (2013.01)

(58) Field of Classification Search
CPC ....... H04J 1/045; H04B 17/345; H04W 24/08
See application file for complete search history.

(56) References Cited

U.S. PATENT DOCUMENTS

| | | | |
|---|---|---|---|
| 6,373,909 B2 | 4/2002 | Lindquist et al. | |
| 6,622,044 B2 | 9/2003 | Bange et al. | |
| 7,024,680 B2 | 4/2006 | Howard | |
| 7,106,781 B2 | 9/2006 | Agee et al. | |
| 7,133,686 B2 | 11/2006 | Hundal et al. | |
| 7,269,151 B2 | 9/2007 | Diener et al. | |
| 7,457,295 B2 | 11/2008 | Saunders et al. | |
| 7,656,897 B2 | 2/2010 | Liu | |
| 7,822,105 B2 | 10/2010 | Underbrink et al. | |
| 7,860,193 B2 | 12/2010 | Gupta | |
| 7,986,922 B2 | 7/2011 | Glazko et al. | |
| 8,027,643 B2 | 9/2011 | Osterling et al. | |

(Continued)

FOREIGN PATENT DOCUMENTS

EP 3035063 A1 6/2016

OTHER PUBLICATIONS

Anritsu Company, MT1000A MU100040A/MU100040B Network Master Pro Operation Manual, First Edition, Aug. 2017.

(Continued)

*Primary Examiner* — Brenda H Pham
(74) *Attorney, Agent, or Firm* — Isabelle Chabot

(57) ABSTRACT

An interference detection method and system and for providing information about at least one interference in I/Q data obtained over-the-air or detected on a link between a radio equipment controller (REC) and at least one radio equipment (RE). The method includes noise filtering a set of the FFTs into an averaged FFT, filtering the averaged FFT with a high-pass filter to remove low frequency components, applying a power threshold on the high-pass filtered FFT to select at least one candidate peak having a power greater than the power threshold; outputting information about the at least one candidate peak, which is a potential interference. The interference detection method further includes multi-lane processing and power shift compensation.

15 Claims, 21 Drawing Sheets

(56) References Cited

U.S. PATENT DOCUMENTS

| | | | |
|---|---|---|---|
| 8,144,824 B2 | 3/2012 | Vrcelj et al. | |
| 8,295,380 B2 | 10/2012 | Zhu et al. | |
| 8,320,433 B2 | 11/2012 | Wegener | |
| 8,428,203 B1 | 4/2013 | Zortea et al. | |
| 8,649,388 B2 | 2/2014 | Evans et al. | |
| 8,694,306 B1 | 4/2014 | Short et al. | |
| 9,014,052 B2 | 4/2015 | Gravely et al. | |
| 9,071,343 B2 | 6/2015 | Abdelmonem | |
| 9,083,567 B2 | 7/2015 | Shi et al. | |
| 9,125,054 B2 | 9/2015 | Ryan | |
| 9,276,605 B2 | 3/2016 | Xia et al. | |
| 9,277,424 B2 | 3/2016 | Garcia | |
| 9,288,683 B2 | 3/2016 | Garcia et al. | |
| 9,385,780 B2 | 7/2016 | Alloin et al. | |
| 9,941,959 B2 | 4/2018 | Heath et al. | |
| 9,979,600 B2 | 5/2018 | Shor et al. | |
| 10,009,784 B1 | 6/2018 | Evircan | |
| 10,067,171 B2 | 9/2018 | O'Keeffe et al. | |
| 10,069,607 B2 | 9/2018 | Shor et al. | |
| 10,158,389 B2 | 12/2018 | Gale et al. | |
| 10,237,765 B1 | 3/2019 | Bradley | |
| 10,476,589 B2 | 11/2019 | Heath et al. | |
| 2013/0045705 A1* | 2/2013 | Kapoor | H04B 1/1036 455/307 |
| 2013/0115904 A1* | 5/2013 | Kapoor | H04B 1/109 455/234.1 |
| 2014/0323058 A1 | 10/2014 | Carbajal | |
| 2015/0358928 A1 | 12/2015 | Dural et al. | |
| 2016/0277050 A1* | 9/2016 | Kato | H04B 7/08 |
| 2017/0245162 A1 | 8/2017 | Beck et al. | |
| 2017/0294928 A1 | 10/2017 | Gale et al. | |
| 2017/0353929 A1 | 12/2017 | Tacconi et al. | |
| 2018/0070254 A1 | 3/2018 | Hannan et al. | |
| 2018/0081047 A1 | 3/2018 | Gander | |
| 2018/0248576 A1 | 8/2018 | Coe et al. | |
| 2018/0269923 A1 | 9/2018 | Chang et al. | |
| 2018/0295553 A1 | 10/2018 | Abdelmonem | |
| 2018/0323815 A1 | 11/2018 | Beadles | |
| 2018/0359048 A1 | 12/2018 | Stephenne | |
| 2018/0368077 A1 | 12/2018 | Laporte et al. | |
| 2019/0052294 A1 | 2/2019 | Abdelmonem | |
| 2019/0058534 A1 | 2/2019 | Anderson | |
| 2019/0222243 A1 | 7/2019 | Abdelmonem | |
| 2019/0326986 A1 | 10/2019 | Heath et al. | |

OTHER PUBLICATIONS

Anritsu Company, Spectrum Master Compact Handheld Spectrum Analyzer, Aug. 2019, United States.
Signalcraft Technologies Inc., CPRI test done brilliantly and affordably, SC2820, SIQMA, CPRI Analyzer, Jun. 6, 2018.
Viavi Solutions Inc., CellAdvisor JD746B/JD786B RF Analyzers, 30176018 901 0316, 2016.
Viavi Solutions Inc., Increase RF Visibility with CPRIAdvisor, 30186095 900 0417, 2017.
Viavi Solutions Inc., Easy Remote Testing of Radiohead Operation with CPRI and OBSAI, 30173210 906 0317, 2017.
Blackard et al., Measurements and Models of Radio Frequency Impulsive Noise for Indoor Wireless Communications, IEEE Journal on Selected Areas in Communications, vol. 11, No. 7, Sep. 1993.
Huang et al., Wireless Spectrum Occupancy Prediction Based on Partial Periodic Pattern Mining, IEEE Transactions on Parallel and Distributed Systems 25, No. 7 (2013): 1925-193, Nov. 8, 2013.
Zhang et al., Compressed Impairment Sensing-Assisted and Interleaved-Double-FFT-Aided Modulation Improves Broadband Power Line Communications Subjected to Asynchronous Impulsive Noise, IEEE, 10.1109/ACCESS.2015.2505676, Dec. 4, 2015.
Brian Weeden, Radio Frequency Spectrum, Interference and Satellites Fact Sheet, Secure World Foundation, Jun. 25, 2013.
Anritsu, Base Station Transmits: Test and Measurement, https://anritsu.typepad.com/basestationtransmits/test-and-measurement/, retrieved on Jun. 3, 2019.
Murali et al., Design of Nano Base Stations for Future Broad Band Applications, International Journal for Modern Trends in Science and Technology, vol. 2, Special Issue 01, Oct. 2016.

* cited by examiner

DETECTION AND TRACKING OF INTERFERERS IN A RF SPECTRUM WITH MULTI-LANE PROCESSING

CROSS-REFERENCE TO RELATED APPLICATION(S)

The present disclosure claims priority to U.S. Provisional Patent Application No. 62/790,560, filed Jan. 10, 2019, and U.S. Provisional Patent Application No. 62/818,935 filed Mar. 15, 2019, the contents of each are incorporated by reference herein.

TECHNICAL FIELD

The present disclosure generally relates to network testing. More particularly, the present disclosure relates to systems and method for automated analysis of Radio Frequency (RF) spectrum to detect and track interferers in the RF spectrum.

BACKGROUND

Mobile network operators (MNOs) can locate Radio Frequency (RF) interference issues in fiber-based mobile networks using real-time, high-resolution RF spectrum analysis over CPRI (Common Public Radio Interface) or eCPRI (evolved Common Public Radio Interface). CPRI, eCPRI, etc. are standards that define an interface between Radio Equipment Controllers (REC) and Radio Equipment (RE). CPRI and eCPRI allow replacement of copper or coaxial cables between a radio transceiver and a base station, such as via fiber. For example, EXFO's OpticalRF™ application provides access to the RF signal through the digital CPRI link available at the base station, located at the bottom of the cell tower or kilometers away as in a Centralized Radio Access Network (C-RAN) architecture. Technicians can quickly and accurately identify critical interference issues such as external RF interference, and internal and external Passive Intermodulation (PIM).

RF interferences are unwanted electromagnetic disturbances that adversely affect the reception of RF signals. Radiocommunication systems are designed to tolerate a certain level of noise and spurious interferences. However, persistent and powerful interferences can cause performance degradation, misinterpretation, or loss of information. For example, when significant interference occurs, users of wireless phones may experience dropped calls or slow internet browsing.

Interferences can be caused by natural phenomena or manmade technology. Natural causes, for example lightning and solar flares, are generally short-duration events and do not lead to persistent performance degradation of radiocommunication systems. Electric and electronic technologies radiate RF energy that can cause interferences. For instance, all devices that involve arcing or varying electromagnetic fields (motors, relays, switches, power lines, lighting fixtures, etc) radiate RF energy. In general, the radiated energy is low-frequency and widely spread, thus having less impact on higher frequency systems like cellular networks. For such systems, the source of interferences that are of concern are those that radiate localized, high-frequency energy. Electromagnetic interference (EMI) emission and usage of the frequency spectrum is highly regulated in the industry to prevent or minimize interferences. However, some equipment may have undergone insufficient certification testing, or may leak RF energy through insufficient shielding, unintended modification, degradation, improper installation or improper usage. Examples include cable television networks, radio boosters, cellular services, wireless microphones, cordless phones, wi-fi hotspots, Bluetooth devices, remote controls, etc.

The detection of interferers in a RF spectrum is a common task carried out by technicians in the field. Interferences appear in a spectrum as persisting peaks. The more powerful ones show up on a RF spectrum in just about any conditions. Other peaks are subtle and require careful tuning of the RF spectrum analysis equipment. An experienced technician will be able to adjust the Resolution Bandwidth (RBW), the Video Bandwidth (VBW), as well as other parameters such as Center Frequency and Span to emphasize the particular interference being hunted for. The OpticalRF™ (ORF) application provides technicians with the speed, granularity, and clarity to identify what issues are present. To operate such an instrument, the user is typically well trained and experimented, such as an RF expert. Mobile operators have a shortage of qualified personnel to operate such instruments.

Power masks can be used to automate the detection of interferers. In some prior art testing equipment, the power mask is made up of multiple segments. The frequency span and power of each segment can be edited to fit a particular spectrum shape.

The main shortcoming of this approach is that the mask is defined based on fixed amplitude values. If, for any reason, the received power shifts up or down, the system may either stop detecting interferers altogether or be constantly in alarm. For a human-operated testset, this may not be so critical, but for autonomous monitoring systems, this not acceptable.

Another problem with masks is that is quite hard to distinguish between normal noise, normal RF activity and interferers. Typically, the mask has to be raised above the noise and RF activity, rendering it useless to detect subtle peaks. Also, masks are sensitive to internal and external Passive Intermodulation PIM (which causes an abnormal slope in the spectrum) which can result in false positives. The problem of distinguishing between normal RF activity and peaks is hard to address with masks. Therefore, there are no testsets that implement automated peak detection on the market.

Another approach to interference detection in the prior art is the creation and analysis of spectrograms. Spectrograms are spectrums that are recorded in time with the power of the spectrum encoded as color scale or gray scale. In those diagrams, interferences may show up as streaks. There are many techniques to detect lines in images through image processing. The streaks could therefore be detected using image processing and reported upon as interferences. However, these techniques do not solve the problem of noise and RF activity.

Other methods for interference detection exist in the prior art that rely on calculating RF statistics or on decoding the signal. Those methods are dependent on some of the specificities of the signal such as the power distribution, the number and width of subcarriers, the modulation used, and so on. For test equipment that simply observe the received signal, those specificities may be hard to obtain automatically, or may require complex configuration from the user.

There is a need for an automated and reliable approach to interferer detection that does not require complex configuration.

SUMMARY

According to one broad aspect of the present invention, there is provided an interference detection method for providing information about at least one interference in I/Q data obtained over-the-air or detected on a link between a radio equipment controller (REC) and at least one radio equipment (RE), the I/Q data being provided as a plurality of FFTs, the interference causing a peak in the FFTs. The method comprises noise filtering a set of the FFTs into an averaged FFT; filtering the averaged FFT with a high-pass filter to remove low frequency components, thereby producing a high-pass filtered FFT; applying a power threshold on the high-pass filtered FFT to select at least one candidate peak having a power greater than the power threshold; outputting information about the at least one candidate peak, wherein the at least one candidate peak is a potential interference.

In one embodiment, the method further comprises post high-pass noise filtering the high-pass filtered FFT after the filtering stage.

In one embodiment, the method further comprises calculating a standard deviation of the high-pass filtered FFT.

In one embodiment, the power threshold is a multiple of the standard deviation.

In one embodiment, the method further comprises splitting the filtering into multiple parallel filtering sub-stages, each filtering sub-stage of the multiple parallel filtering sub-stages being tuned differently to create a plurality of different high-pass filters; applying the power threshold in each of the multiple parallel filtering sub-stages to obtain a plurality of candidate peak lists; merging the plurality of candidate peak lists in a candidate peak merger.

In one embodiment, filtering the averaged FFT with the high-pass filter further comprises applying a symmetry factor related to a symmetry of the at least one candidate peak thereby compensating for a power shift.

In one embodiment, the method further comprises grouping ones of the at least one candidate peak into a grouped peak if the ones are separated by less than a maximum peak distance parameter.

In one embodiment, the method further comprises repeating the steps of noise filtering, filtering and applying the power threshold for a next set of the FFTs; tracking a presence of a tracked peak in the at least one candidate peak of the set and the next set to obtain a tracked peak; outputting information about the tracked peak.

In one embodiment, tracking includes using a maximum peak movement parameter to match the at least one candidate peak of the set and the next set.

In one embodiment, the method further comprises accumulating the power of the tracked peak from the set of FFTs and the next set of FFTs into an accumulated power; identifying a status of the tracked peak as declared if the accumulated power is greater than a declare threshold; wherein the outputting information about the tracked peak further comprises outputting the status of the tracked peak.

In one embodiment, the declare threshold is a multiple of the standard deviation.

In one embodiment, the method further comprises identifying the status of the tracked peak as clear if the accumulated power is smaller than a clear threshold, wherein the declare threshold is greater than the clear threshold.

In one embodiment, the clear threshold is a multiple of the standard deviation.

In one embodiment, tracking the presence further comprises merging adjacent tracked peaks if the tracked peaks are closer than the maximum peak movement parameter by selecting a highest powered tracked peak.

According to another broad aspect of the present invention, there is provided a non-transitory computer-readable storage medium having computer readable code stored thereon for programming a test system to perform the steps of: obtaining I/Q data; processing the I/Q data to detect interferences; causing display of a user interface that includes a reporting of the interferences.

According to another broad aspect of the present invention, there is provided a test system comprising: a detector configured to obtain I/Q data; a processor; and memory storing instructions that, when executed, cause the processor to carry out the steps of an interference detection method for providing information about at least one interference.

According to another broad aspect of the present invention, there is provided a computer program, comprising instructions which, when executed on at least one processor, cause the at least one processor to carry out an interference detection method for providing information about at least one interference.

According to another broad aspect of the present invention, a combination of filtering and peak tracking is used to detect interferences.

According to another broad aspect of the present invention, there is provided a peak detection method for a RF spectrum. The steps include averaging raw FFTs of the RF spectrum into averaged FFTs to reduce the level of noise and emphasize at least one interference, filtering the averaged FFTs with a high-pass filter to remove a low frequency component of the RF spectrum, thereby producing a high-pass filtered FFT, calculating the standard deviation of the high-pass filtered FFT, applying a threshold to the high-pass filtered FFT to select at least one candidate peak greater than the threshold and with a peak width smaller than a maximum peak distance parameter. Optionally, determining a power of the candidate peak and identifying a status of the candidate peak as declared if the power is greater than a declare threshold.

According to another broad aspect of the present invention, there is provided a peak detection method for a RF spectrum including a plurality of raw FFTs, the method comprising: noise filtering the raw FFTs of the RF spectrum into averaged FFTs to reduce the level of noise and emphasize at least one interference; Filtering the averaged FFTs with a high-pass filter to remove a low frequency component of the RF spectrum, thereby producing a high-pass filtered FFT; Calculating the standard deviation of the high-pass filtered FFT; Applying a threshold to the high-pass filtered FFT to select at least one candidate peak greater than the threshold and with a peak width smaller than a maximum peak distance parameter, the threshold being a multiple of the standard deviation, the at least one candidate peak being the at least one interference; Outputting information about the at least one candidate peak.

In one embodiment, the method further comprises averaging the high-pass filtered FFT prior to the calculating the standard deviation.

In one embodiment, the method further comprises determining a power of the candidate peak.

In one embodiment, the method further comprises identifying a status of the candidate peak as declared if the power is greater than a declare threshold.

In one embodiment, the method further comprises outputting the status of the candidate peak.

In one embodiment, the method further comprises accumulating a power of the candidate peak over multiple extractions of the candidate peak.

In one embodiment, the filtering stage splits the processing in multiple lanes, each lane being tuned to recognize a certain type of peak.

According to another broad aspect of the present invention, there is provided a peak detection method for a RF spectrum including a plurality of raw FFTs, the method comprising: Averaging a set of the raw FFTs of the RF spectrum into averaged FFTs to reduce the level of noise and emphasize at least one interference; Filtering the averaged FFTs with a high-pass filter to remove a low frequency component of the RF spectrum, thereby producing a high-pass filtered FFT; noise filtering the high-pass filtered FFT to further reduce noise after the filtering stage; Calculating the standard deviation of the high-pass filtered FFT; Applying a power threshold on the high-pass filtered FFT to select at least one candidate peak having a power greater than the power threshold and with a peak width smaller than a maximum peak distance parameter, the threshold being a multiple of the standard deviation, the at least one candidate peak being the at least one interference; Repeating the steps of averaging, filtering, noise filtering, calculating and applying for a next set of raw FFTs of the RF spectrum; Tracking a presence of a tracked peak in the at least one candidate peak of at least two sets of raw FFTs; Accumulating the power of the tracked peak; Identifying a status of the tracked peak as declared if the accumulated power is greater than a declare threshold; Outputting information about the at least one tracked peak.

In one embodiment, tracking the presence further comprises determining if the at least one candidate peak of the at least two sets of raw FFTs are within a maximum peak movement parameter.

According to another broad aspect of the present invention, there is provided an interference detection method and system for providing information about at least one interference in I/Q data obtained over-the-air or detected on a link between a radio equipment controller (REC) and at least one radio equipment (RE). The method includes noise filtering a set of the FFTs into an averaged FFT, filtering the averaged FFT with a high-pass filter to remove low frequency components, applying a power threshold on the high-pass filtered FFT to select at least one candidate peak having a power greater than the power threshold; outputting information about the at least one candidate peak, which is a potential interference. The interference detection method further includes multi-lane processing and power shift compensation.

The above-described embodiments may be combined with one another in any combination.

BRIEF DESCRIPTION OF THE DRAWINGS

Having thus generally described the nature of the invention, reference will now be made to the accompanying drawings, showing by way of illustration example embodiments thereof and in which:

FIG. 1 includes FIG. 1A, FIG. 1B and FIG. 1C in which

FIG. 3 includes FIG. 3A and FIG. 3B, in which

FIG. 4 includes FIG. 4A and FIG. 4B, in which

FIG. 5 includes FIG. 5A and FIG. 5B, in which

FIG. 8 includes FIG. 8A, FIG. 8B, and FIG. 8C, in which

FIG. 9 includes FIG. 9A, FIG. 9B and FIG. 9C in which

FIG. 14 includes FIG. 14A and FIG. 14B, in which

DETAILED DESCRIPTION

The present system and method automate the detection and tracking of interferers in real-time spectrum data. The process applies a cascade of filters to the spectrum that attenuate noise and emphasize peaks. The filtered data is used to apply a threshold that is based on the standard deviation of the data. The peaks crossing the threshold are then tracked in time to confirm their presence and track their movement.

Figure 1A:
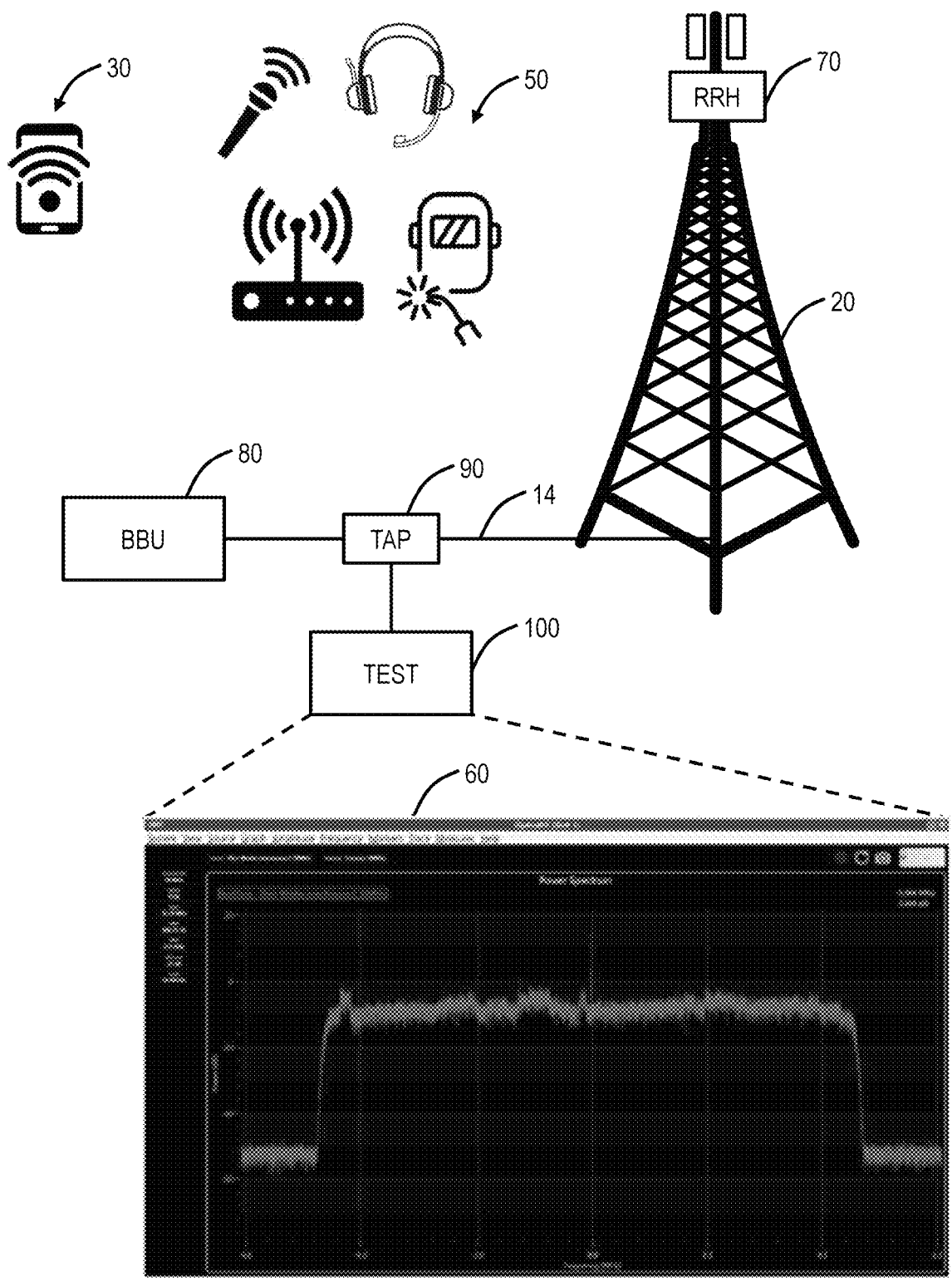
FIG. 1A is a block diagram of a test system with an associated User Interface (UI)

FIG. 1A is a block diagram of a test system 100 with an associated User Interface (UI) 60. The test system 100 is connected to a CPRI or eCPRI link 14 via a tap or splitter 90. For example, the CPRI link 14 can be a fiber connection between a Remote Radio Head (RRH) or CPRI Radio Equipment (RE) 70 on a cell tower 20 and a Baseband Unit (BBU) or CPRI Radio Equipment Control (REC) 80. The tap 90 can be an optical power tap which provides a portion of the optical power on the CPRI link 14 to the test system 100 for analysis thereof.

The cell tower 20 is in communication with cell phones 30 and other wireless devices. Other radiating devices 50 are present in the environment of the cell tower 20 and may cause interferences in the signal captured by the cell tower 20. In that case, they become known as interferers. Some radiating devices 50 are known to cause interferences at specific frequencies. Example radiating devices include a Wi-Fi hotspot device and a wireless microphone and audio amplifier which cause interferences at 780 MHz. An arc soldering activity may also cause interferences.

An AxC within the CPRI link 14 is an Antenna Carrier. It is a portion of the CPRI link where I/Q samples of a particular antenna are transported. For the untrained eye, it is difficult to provide an assessment of the quality of the CPRI link 14 by looking at the spectrum trace in the UI 60. Experience is required to properly set the different parameters and values such as RBW, VBW, min trace, max trace, etc. on the test system 100. Furthermore, the user has to correlate interferences on multiple AxCs manually by bringing up multiple graphs and comparing them in order to identify interferers.

Figure 1B:
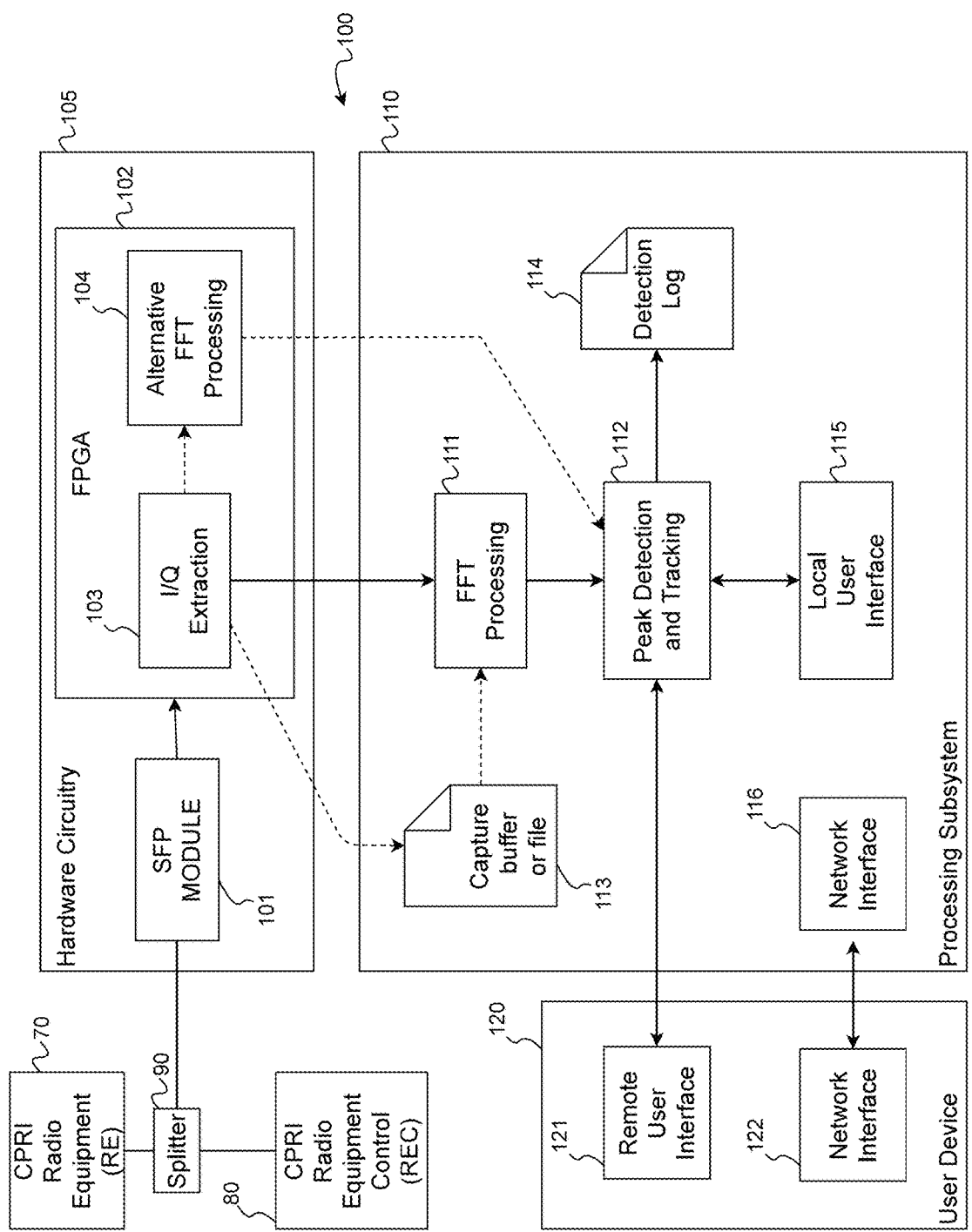
FIG. 1B is a functional block diagram showing main components of an example system for automated peak detection and FIG. 1C is a functional block diagram of an alternative system for automated peak detection.

FIG. 1B is a functional block diagram of the test system 100. It shows one example implementation that comprises Hardware Circuitry 105, Processing Subsystem 110 and optional user device 120. The Hardware circuitry 105 and the processing subsystem 110 are communicatively coupled via a local interface such as, for example, one or more buses or other wired or wireless connections, as is known in the art.

It should be appreciated by those of ordinary skill in the art that FIG. 1 depicts the system in an oversimplified manner, and a practical embodiment may include additional components and suitably configured processing logic to support known or convention operating features that are not described in detail herein. For example, appropriate input/output (I/O) interfaces, network interfaces and memory are provided.

The Hardware Circuitry 105 can be any combination of off-the-shelf hardware components, e.g. a small form-factor pluggable (SFP) module and a field-programmable gate-array (FPGA) device.

Within the Processing Subsystem 110, functional components allow to carry out Peak Detection and Tracking Algorithm 112. The processing subsystem 110 is embedded on a processor which is a hardware device for executing software instructions. The processor may be any custom made or commercially available processor, a Central Processing Unit (CPU), an auxiliary processor among several processors associated with the test system 100, a semiconductor-based microprocessor (in the form of a microchip or chip set), or generally any device for executing software instructions. When the test system 100 is in operation, the processor is configured to execute software stored within the memory, to communicate data to and from the memory, and to generally control operations of the test system 100 pursuant to the software instructions. The I/O interfaces may be used to receive user input from and/or for providing system output to one or more devices or components. The user input may be provided via, for example, a keyboard, touchpad, and/or a mouse. System output may be provided via a display device and a printer (not shown). I/O interfaces may include, for example, a serial port, a parallel port, a Small Computer System Interface (SCSI), a Serial ATA (SATA), a fibre channel, Infiniband, iSCSI, a PCI Express interface (PCI-x), an Infrared (IR) interface, a Radio Frequency (RF) interface, a Universal Serial Bus (USB) interface, or the like.

The network interface may be used to enable the test system 100 to communicate on a network, such as the Internet. The network interface may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface may include address, control, and/or data connections to enable appropriate communications on the network. For example, the UI 60 in FIG. 1 can be provided via a display device connected to the I/O interfaces and/or via a remote device connected via a network through the network interface.

The memory may include any of volatile memory elements (e.g., Random Access Memory (RAM, such as DRAM, SRAM, SDRAM, etc.)), nonvolatile memory elements (e.g., ROM, hard drive, tape, CDROM, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory may include one or more software programs, each of which includes an ordered listing of executable instructions for implementing logical functions. The software in the memory includes a suitable operating system (O/S) and programs. The operating system essentially controls the execution of other computer programs, such as the programs, and provides scheduling, input-output control, file and data management, memory management, and communication control and related services. The programs may be configured to implement the various processes, algorithms, methods, techniques, etc. described herein.

Within the Hardware Circuitry 105, the SFP module 101 is adapted to connect to the CPRI link between the CPRI Radio Equipment (RE) 70 and the CPRI Radio Equipment Control (REC) 80 such as via splitter 90. For example, when the CPRI link is a fiber optic link, the SFP module 101 may include a detector which can be a receiver, i.e. a photodetector, that is configured to receive a signal for processing by the hardware circuitry 105.

The SFP module 101 converts the optical signal to an electrical signal that is fed to the FPGA 102 transceivers. The I/Q Extraction unit 103 extracts the I and Q samples as specified in the CPRI Specifications and provides a stream of data to the FFT processing 111. The FFT processing 111 cumulates the time-domain I/Q samples and transforms them to the frequency-domain using fast-Fourier transform. The resulting spectrums are used by the Peak Detection and Tracking algorithm 112, which feeds the results to a local interface 115, and possible also to a remote user interface 121 (via processing subsystem network interface 116 and user device network interface 122) and a detection log 114. Note that FPGA 102 could optionally perform the FFT processing as well as part of the filtering included in Peak Detection and Tracking Algorithm 112 in Alternate FFT Processing 104. Also, it is possible to consider processing captured data instead of real-time data. In that case, the I/Q samples could come for a Capture Buffer or File 113.

The present disclosure relates to the analysis of the I/Q data of antennas. I/Q data refers to the real (I) and imaginary (Q) components of the complex-valued transmitted baseband signal. I/Q data are the samples of the constellation for the modulation type used. Between Radio Equipment Controllers (REC) and Radio Equipment (RE), I/Q data is typically transported. Those skilled in the art will recognize examples of transport interfaces including CPRI, eCPRI, etc. and the present disclosure contemplates any fiber optic links. That is, the present disclosure contemplates operation to monitor CPRI, eCPRI, variants of CPRI and eCPRI, and the like, and the term fiber optic link used herein is meant to cover all such embodiments.

Figure 1C:
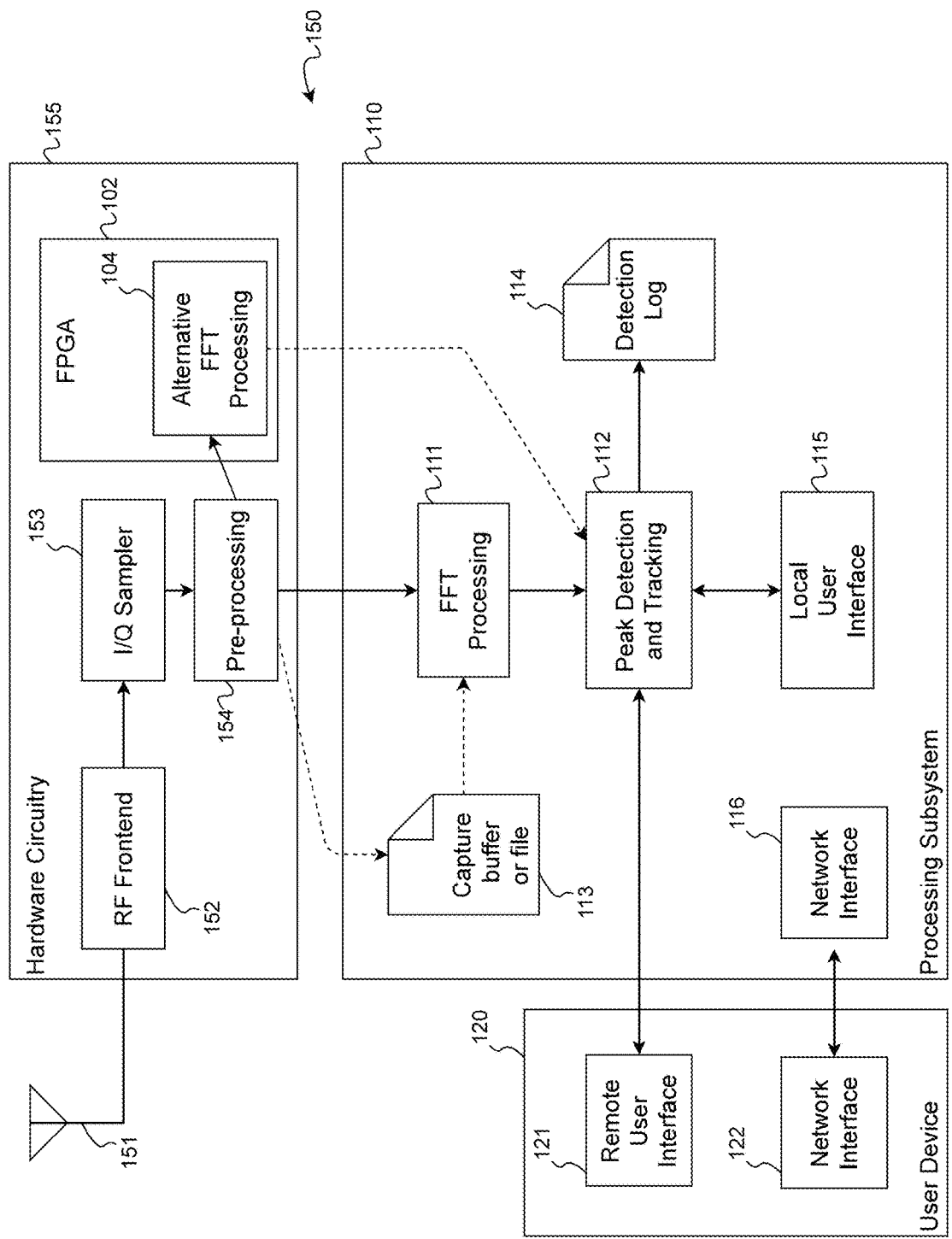

In alternative embodiments, the I/Q data of antennas can be captured over-the-air. FIG. 1C presents another implementation of the system 150 where the RF signal is captured over-the-air. The signal is received by an antenna 151 and is processed by the RF front-end 152 (e.g. low-noise amplifying, band filtering, etc) in Hardware circuitry 155. The resulting signal is sampled by the I/Q sampler 153 and optionally pre-processed by pre-processing 154 (e.g. digital filtering, decimation, etc.). The resulting stream of I/Q time-domain samples can be used for peak detection as described in the same way as described for the system depicted in FIG. 1B.

Figure 2:
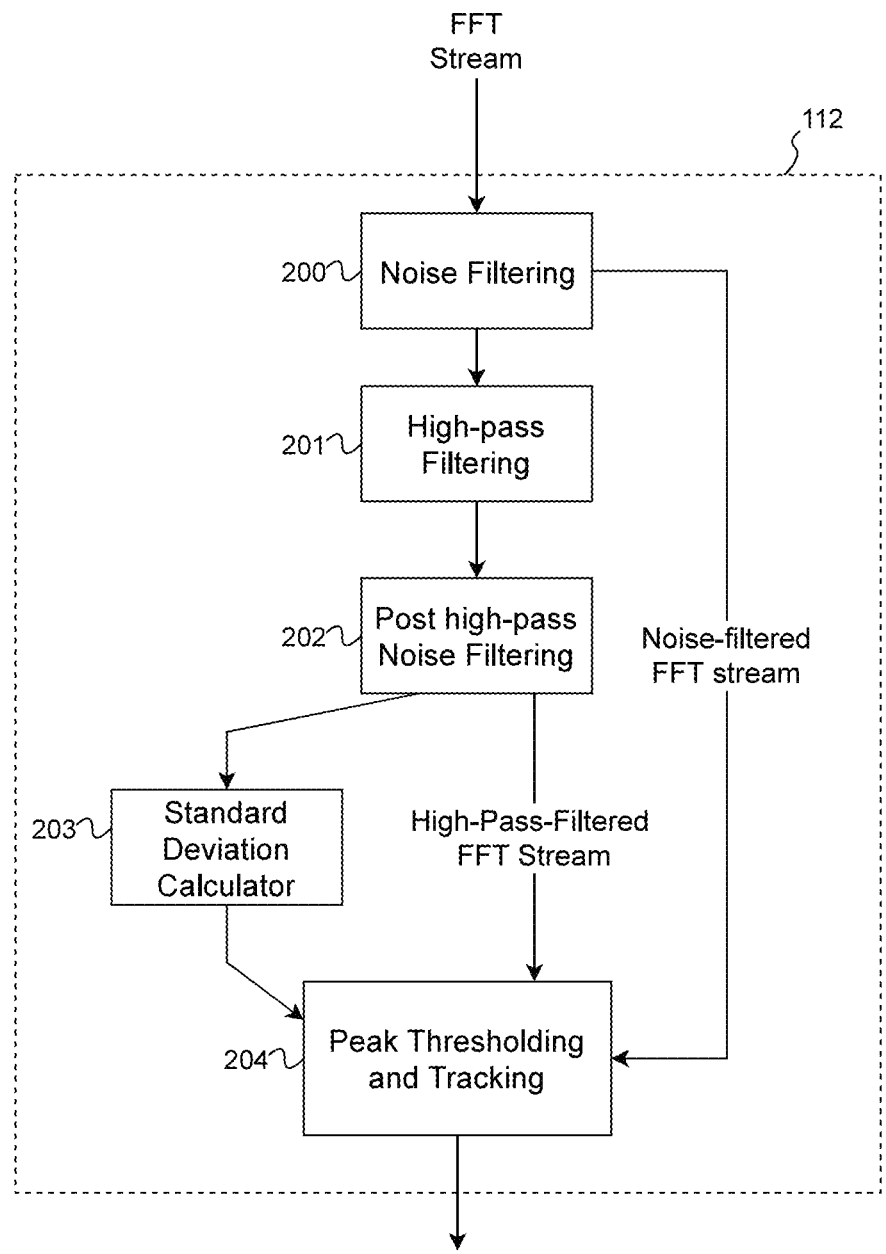
FIG. 2 is a flow chart showing main steps of an example embodiment of the peak detection method.

FIG. 2 is a flow chart showing main steps of an example peak detection method occurring in peak detection and tracking 112. It consists of several processing stages. The first stage is Noise Filtering 200 which reduces the noise present in the incoming FFT stream. The cleaned-up FFTs go through High-pass Filtering 201 that removes low frequency elements of the spectrum. The third stage is Post High-Pass Noise Filtering 202 to further reduce the noise before passing the high-pass filtered FFTs to the Peak Thresholding and Tracking 204 stage. In addition to high-pass filtered FFTs, this stage requires the standard deviation calculated by the Standard Deviation Calculator 203, as well as the original spectrums before high-pass filtering.

Figure 3A:
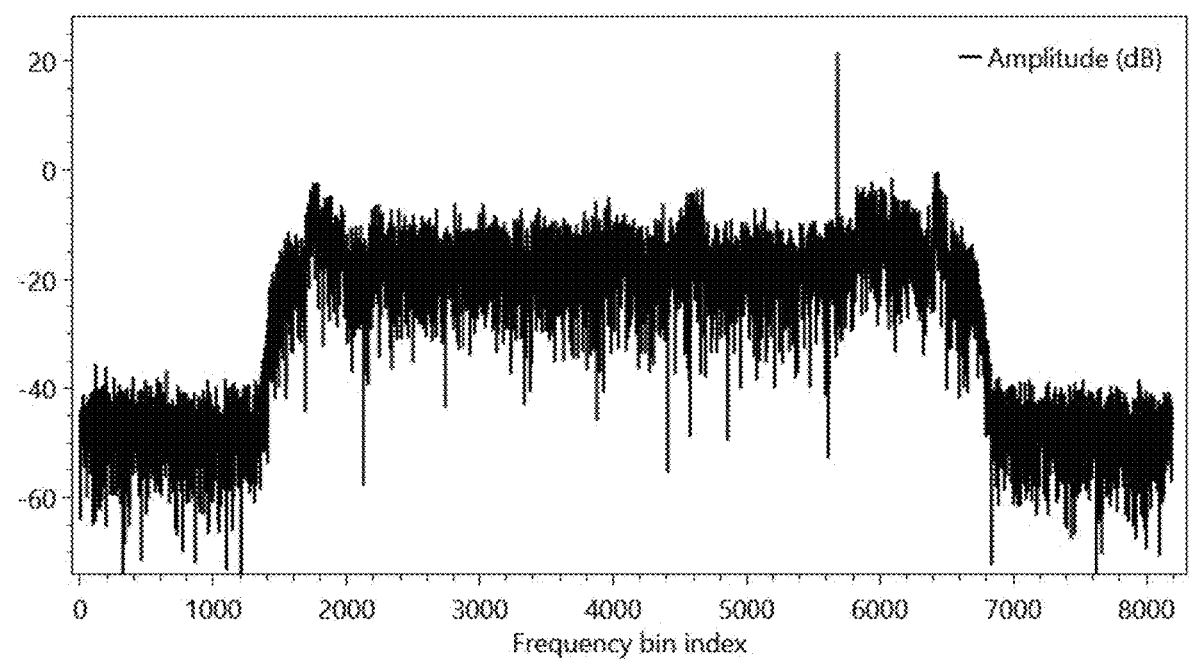
FIG. 3A is a graph of one FFT and FIG. 3B is a graph of an average of 4 FFTs.
Figure 3B:
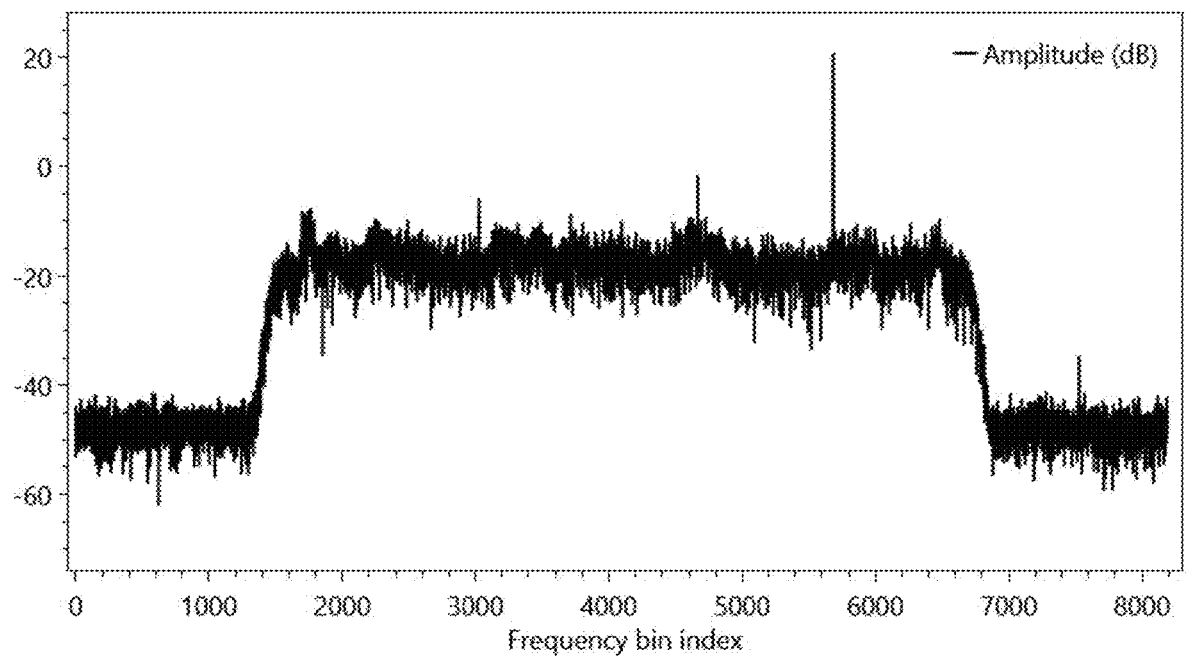

Spectrums are inherently noisy whereas interferences tend to persist through time. Because of that characteristic, noise filtering, such as averaging, is a good method for first stage noise filter 200. Successive FFTs are added bin-by-bin, then each summed bin is divided by the amount of FFTs. FIG. 3A is a graph showing a snapshot of a single FFT. The effect of averaging 4 consecutive FFTS is shown in FIG. 3B. The random noise is attenuated while the peak amplitude stays intact.

Figure 4A:
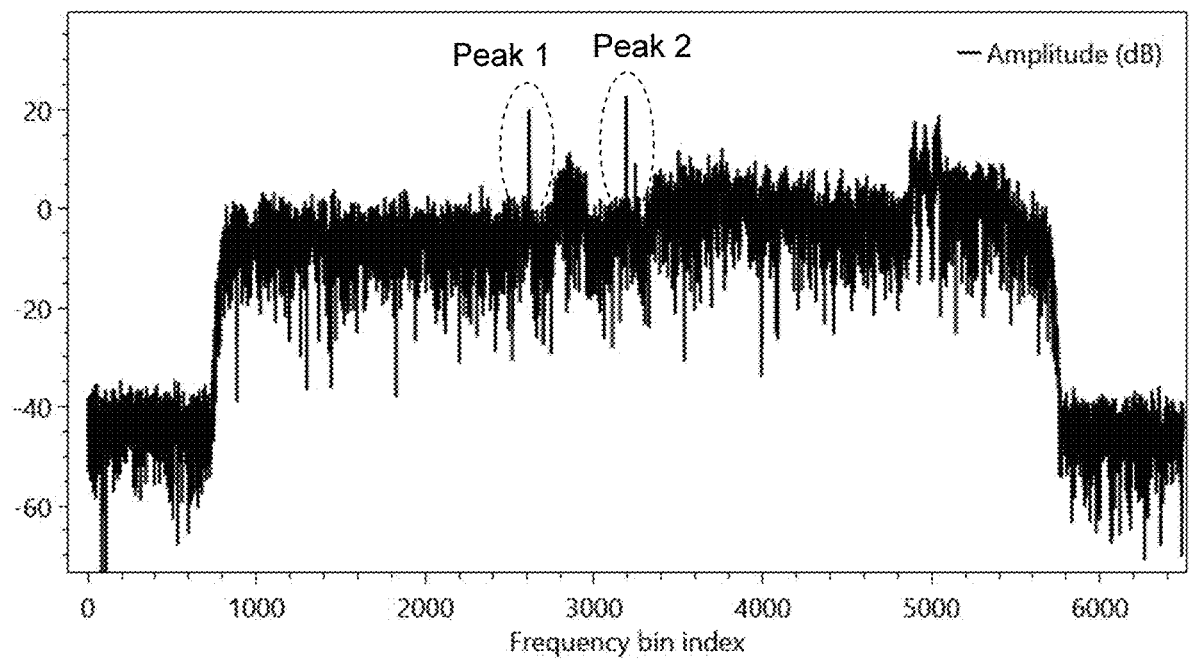
FIG. 4A is a graph of one FFT and FIG. 4B is a graph of an averaged FFT on which peaks have moved.
Figure 4B:
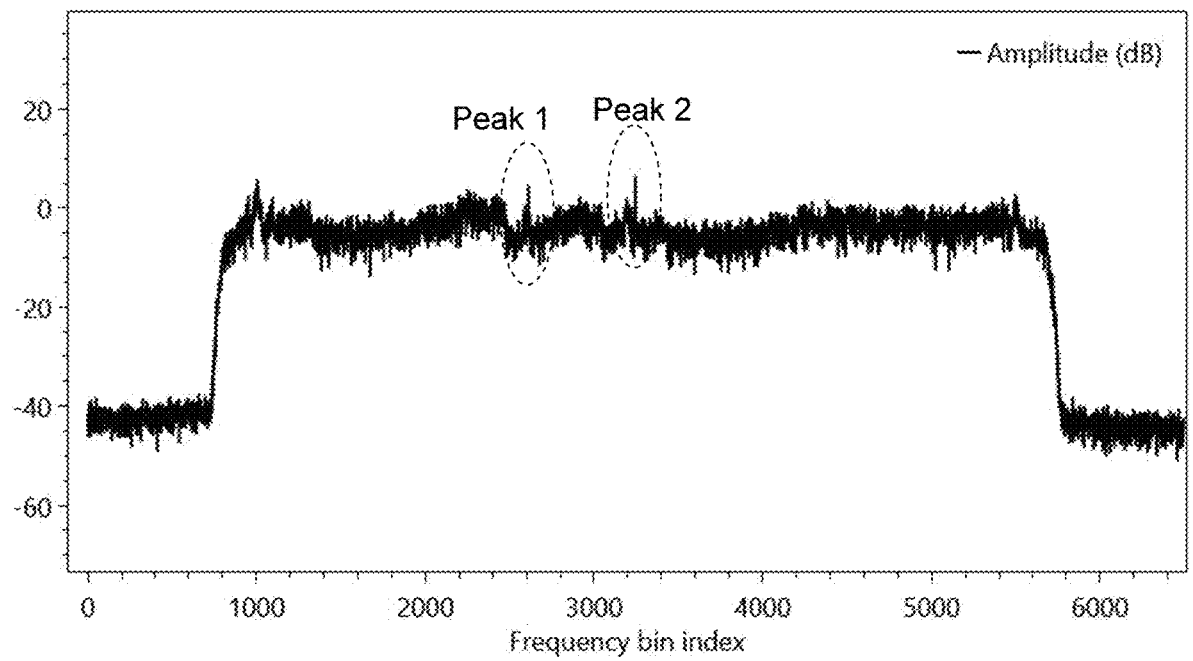

If noise filtering is done through averaging, it is important to properly select the amount of FFTs averaged together. It is common that the frequency of interferers wavers and averaging in this case attenuates the interferences. FIG. 4 illustrates the effect of averaging on moving peaks. FIG. 4A shows a snapshot of a signal that exhibits two sharps peaks Peak 1 and Peak 2. Peak1 and Peak 2 move by about 50 bins around a center frequency at different points in time. FIG. 4B shows the resulting signal after several such snapshots of moving peaks go through an FFT averaging process. Even with an averaging of only 4 FFTs, the amplitude of the two peaks Peak 1 and Peak 2 is clearly attenuated.

Figure 5A:
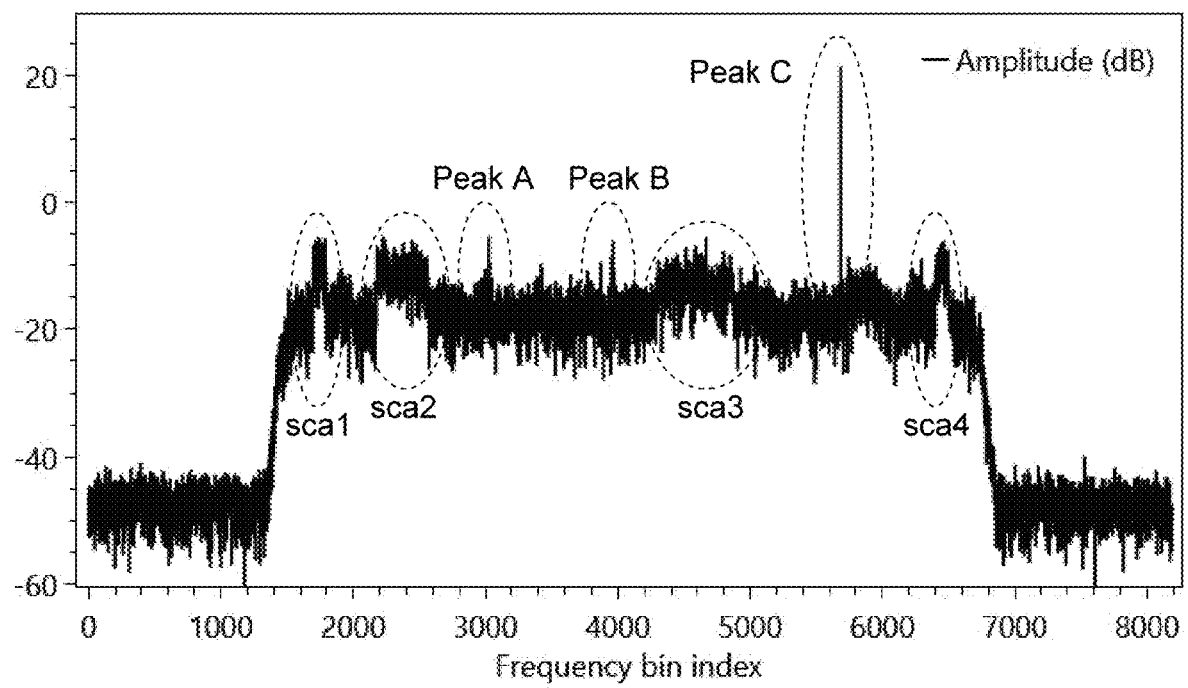
FIG. 5A is a graph of a FFT with a plurality of events and FIG. 5B is a graph of a high-pass filtered FFT on which peaks caused by interferences are emphasized by applying a high-pass filter.
Figure 5B:
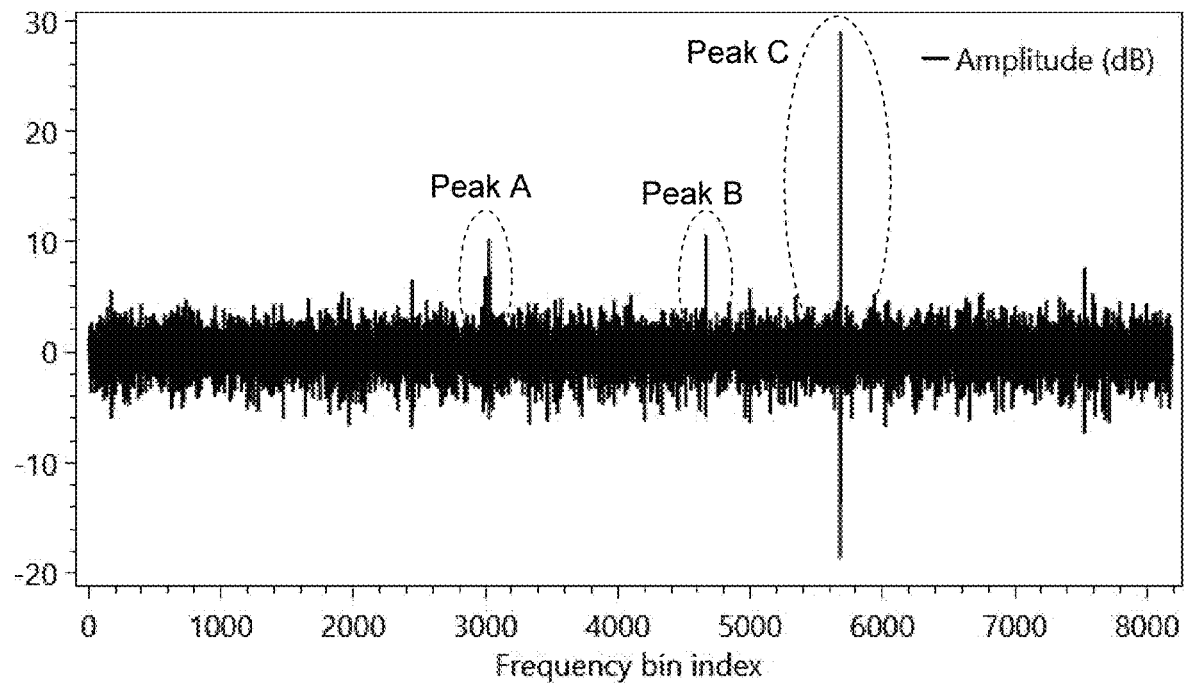

The goal of the high-pass filter 201 is to remove the low frequency components of the spectrum which includes the shoulders of the spectrum (transition from noise floor to occupied bandwidth), the subcarrier activity and any PIM defect. The high-pass filtered FFTs are flat and centered around 0 dB. FIG. 5 illustrates the effect of applying a high-pass filter. FIG. 5A is a graph of the averaged FFTs. FIG. 5B is a graph of the same spectrum on which a high-pass filter has been applied. The peak candidates Peak A, Peak B and Peak C are clearly visible and can be more easily detected using a threshold. The impact of the subcarrier activity regions sca1, sca2, sca3 and sca4 has been eliminated. The shoulders of the spectrum are ignored. The high-pass characteristic also means that very wide interferers are removed as well and require different processing to be detected.

The high-pass filter 201 can be implemented in various ways. In the described implementation, the specific filter used is adapted from a filter commonly used as an edge detector for image processing. Instead of a 2-D kernel, it is a one-dimension kernel that is applied over the one-dimension spectrum. The kernel is calculated by approximating the Laplacian of Gaussian (LOG) filter using the difference of two gaussian functions with specific values for sigma: σ

$$\nabla^2 G_\sigma \approx G_{\sigma 1} - G_{\sigma 2} \text{ where } \sigma 1 = \frac{\sigma}{\sqrt{2}} \text{ and } \sigma 2 = \sqrt{2}\,\sigma \quad \text{Equation 1}$$

The response of the high-pass filter can be adjusted with the sigma parameter. The sigma parameter is determined at design time based on the required performance. Using a small value, only narrow peaks are detected. If the value is large, larger peaks will be detected, however the kernel then tends to act like a band-pass filter and also attenuates sharp peaks. It has been found that a value between 1 and 10 gives good results for fine to medium peaks with an FFT size of 32768 bins. For wider peaks, much larger values should be used; for instance peaks that are 200 kHz wide work best with a sigma of 40 (with FFT size of 32768 bins for a 10 MHz spectrum).

Figure 6:
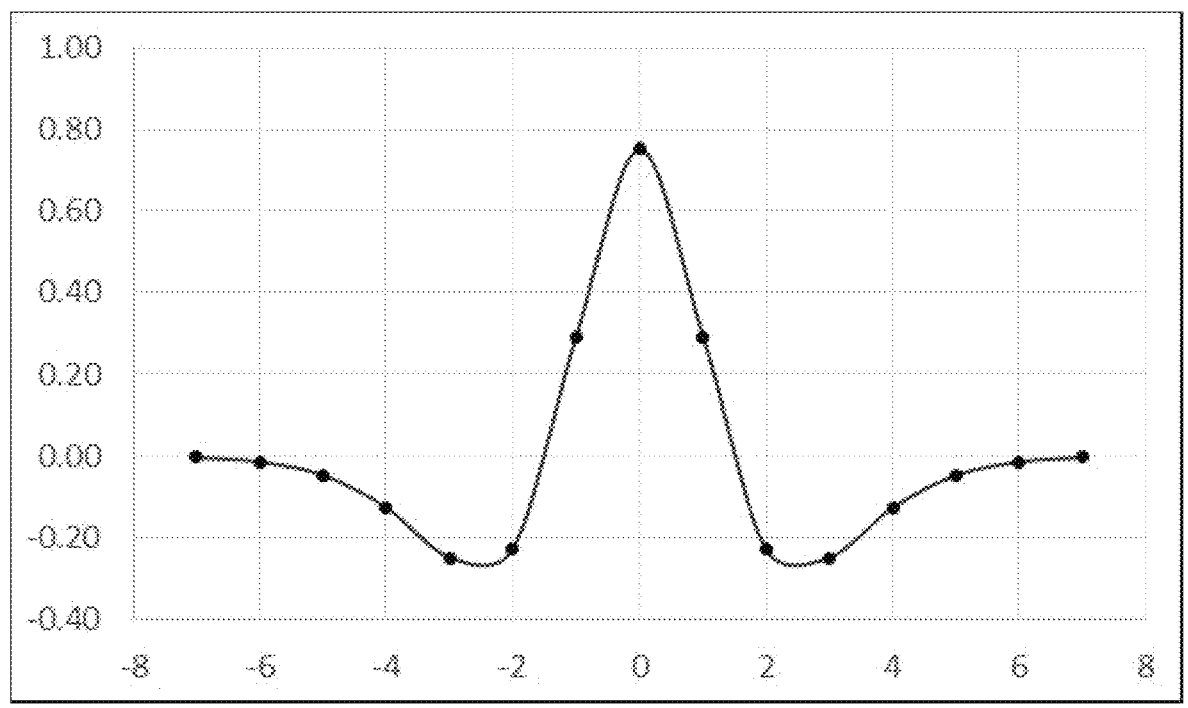
FIG. 6 is a graph which shows a kernel of 15 elements for a sigma of 1.5.

The high-pass filter characteristics of the LOG kernel implies that the sum of its values over infinity is 0. In practice, the kernel should be wide enough so that the sum of values of the kernel is close enough to 0 to preserve the high-pass characteristics of the filter. As a rule of thumb, having 10 times the value of sigma is sufficiently wide. FIG. 6 shows a kernel of 15 elements for a sigma of 1.5 using this rule of thumb. The sum of the kernel coefficients is around 0.001 (precisely at 0.00144). This is sufficiently low to block low-frequency components in the spectrum given the range of values in dB.

Figure 7:
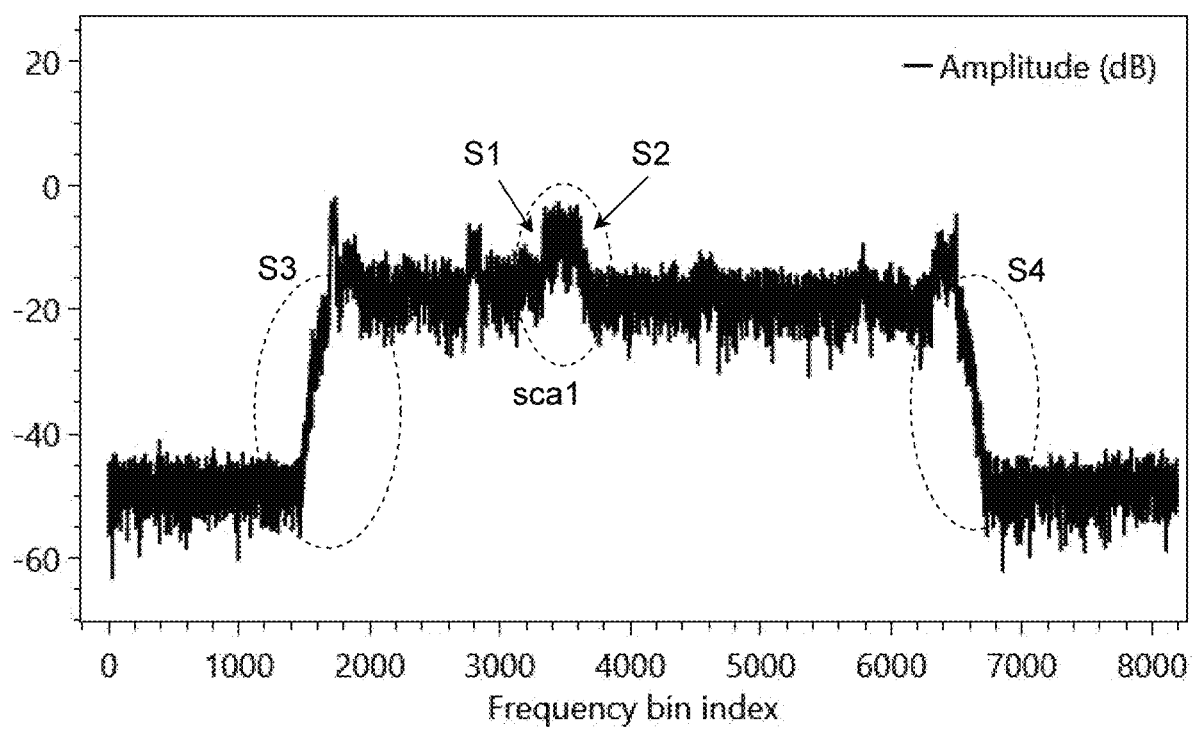
FIG. 7 is a graph of an example RF spectrum with apparent normal network activity and an interferer peak.

The high-pass characteristics of the basic LOG kernel are very good, but it is sensitive to localized shifts in the mean power level because those events contain high-frequency components. FIG. 7 shows an example spectrum and highlights multiple locations where a power shift could lead to incorrect detection of an interferer. Normal radio activity, known as subcarrier activity, often includes localized power shift at the edges and may cause false detection of interferers (as shown in FIG. 7 where one of the subcarrier activity sca1 is surrounded by shifts S1 and S2 at its edges). The most powerful shifts S3 and S4 occur on each side of the occupied bandwidth to the noise floor; any persistent activity in the vicinity of those shifts is more likely to be detected incorrectly as an interferer.

Figure 8A:
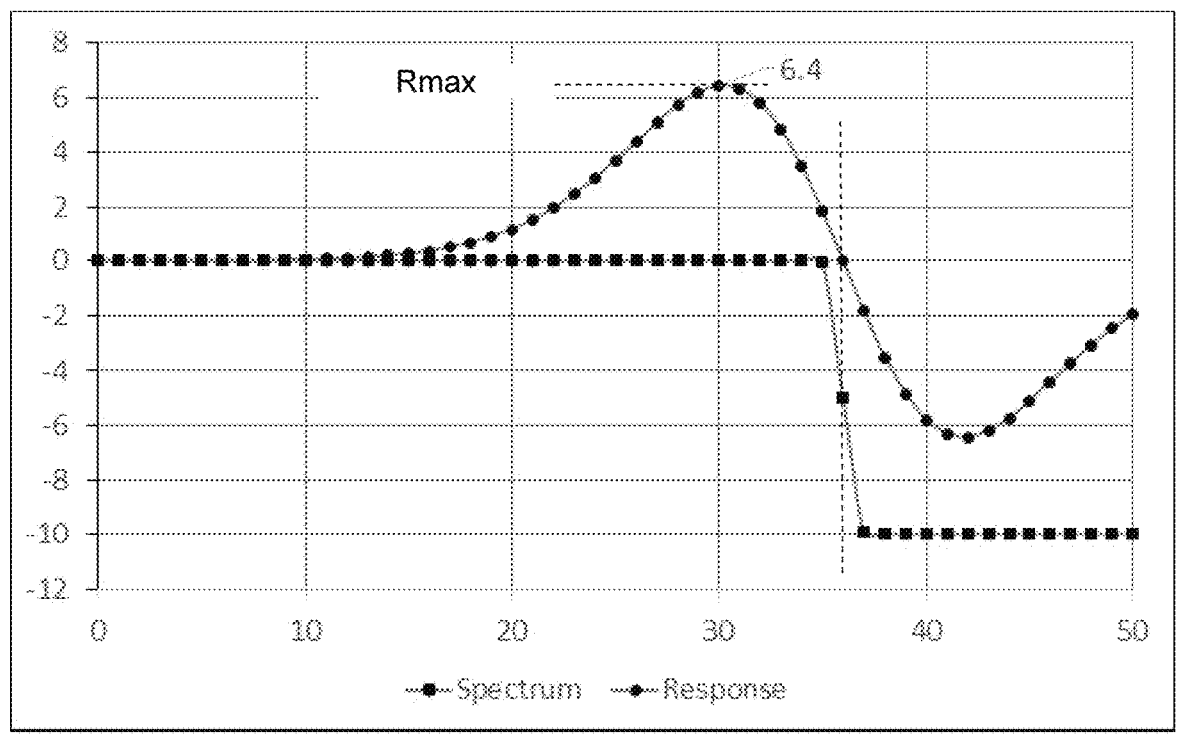
FIG. 8A shows the response of the LOG kernel to a mean power shift.
Figure 8B:
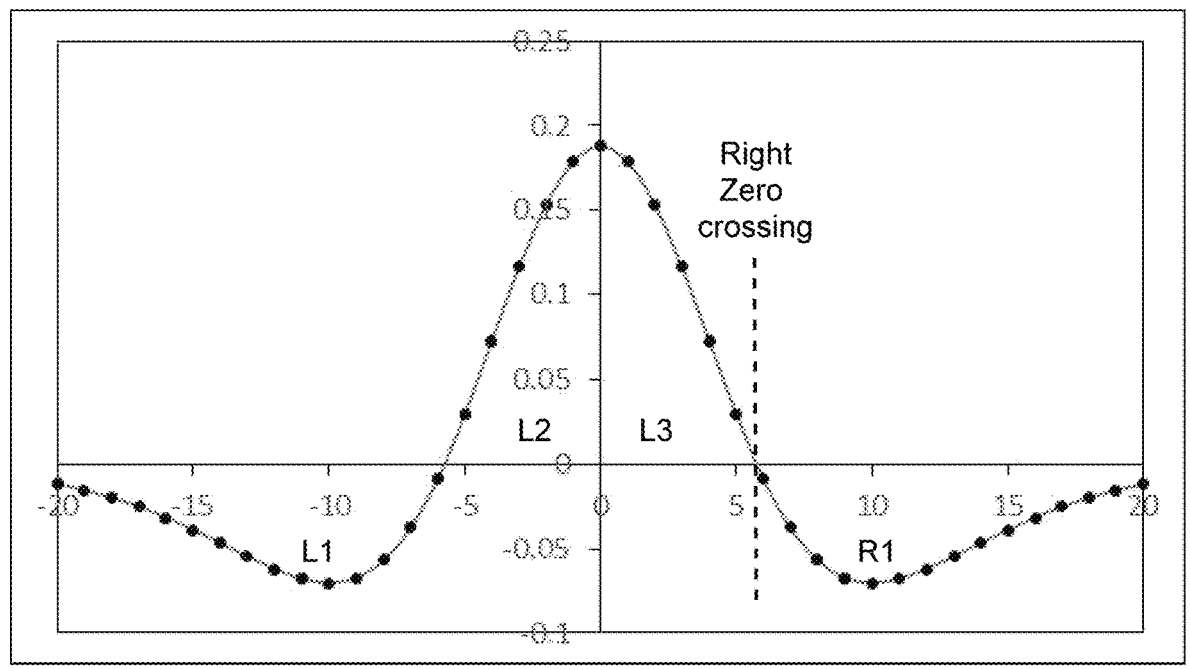
FIG. 8B shows the sums of coefficients on each side of the right zero-crossing and FIG. 8C shows the response of a LOG kernel that is modulated by a symmetry factor.

FIG. 8A shows a simulated spectrum with a 10 dB shift in power and the corresponding response of the LOG kernel with sigma=6. The maximum positive response Rmax occurs when the power drop is aligned with the right zero-crossing of the kernel approximately 6 samples to the right of the maximum response, as apparent in FIG. 8B. FIG. 8B shows the sum of the coefficients on each side of the zero-crossing for a LOG kernel with sigma=6. The approximate sum of the coefficients on the left (regions L1, L2 and L3) and on the right (region R1) of the zero-crossing is respectively −0.64 and 0.64. When the power shift and the zero-crossing are aligned, the convolution value is the difference in power times 0.64, hence the 6.4 maximum response. The maximum negative response occurs when the shift is aligned with the left zero-crossing.

One approach to mitigate this effect is to introduce an element of symmetry in the high-pass filter processing. Unlike subcarrier activity, the mean power level on either side of the interferer in FIG. 7 is very similar. When the difference in mean power is large, a large response is likely not caused by an interferer. The output of the high-pass filter can be modulated by the amount of difference of mean power on both sides of the peak to mitigate this cause of false detection.

Based on this approach, the present implementation calculates the convolution in three parts: the left portion, the center element and the right portion. The sum of the parts of the convolution are then multiplied by a symmetry factor. The following equation for the symmetry factor is used but other approaches could be used as well:

$$\text{Symmetry factor} = e^{-\frac{(left-right)^2}{\sigma_{lr}^2}} \quad \text{Equation 2}$$

Figure 8C:
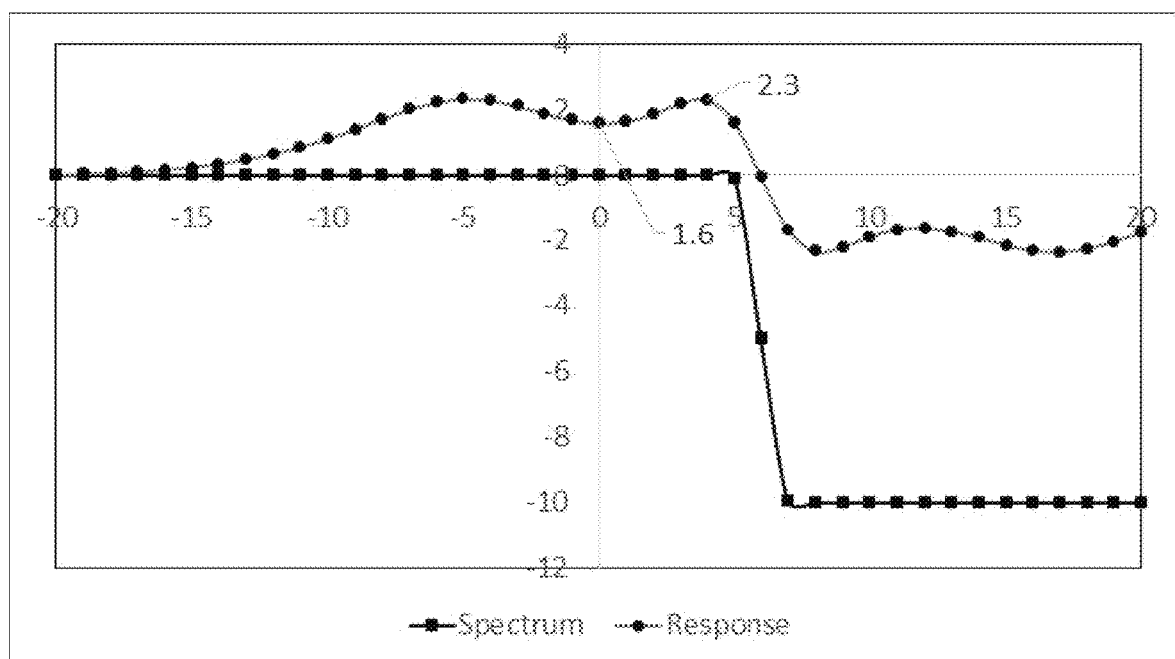

Equation 2 equals 1 for a totally symmetric convolution and tends to 0 for largely asymmetric convolutions. The $\sigma_{lr}$ parameter is different from the sigma parameter of the kernel and is designated as the left-right symmetry sigma. It controls the amount of correction for symmetry. A value closer 0 results in a more stringent symmetry requirement. Larger values are more tolerant to asymmetry. The symmetry sigma value $\sigma_{lr}$ can be determined based on the required attenuation for a given power difference between left and right parts of the convolution. For example, to attenuate the response to a 10 dB step by a factor of 4, the ratio of step to $\sigma_{lr}$ should be 1.177 (square root of absolute value of natural log of 0.25). As shown in FIG. 8B, a 10 dB step will result in a convolution value of 6.4, yielding a $\sigma_{lr}$ value of 5.43. FIG. 8C is a graph of the resulting attenuated response to a 10 dB power step (sigma of 6 for the kernel and with $\sigma_{lr}$ equal to 5.43). The response has indeed been attenuated by a factor of four which could be sufficient to avoid identifying a sharp edge as a peak. However, there are ripples on each side that may warrant an even higher attenuation (lower value for $\sigma_{lr}$).

The third stage, Post High-Pass Noise Filtering 202, of FIG. 2 is noise filtering to emphasize peaks versus the surrounding noise. Averaging can be used provided the value is chosen with care because of the drawback of attenuating moving peaks. An additional averaging of 4 FFTs after the high-pass filter has been found to be appropriate.

Stage 203 in FIG. 2 consists in the calculation of standard deviation as a measure of the remaining noise. It allows defining a threshold as a factor (or multiple) of standard deviation, instead of simply using an absolute value. The result is a more robust peak detection that adapts to variations in the level of noise. Even with a threshold defined in terms of standard deviation, a simple thresholding process would lead to multiple false positives and would not be reliable enough for a monitoring environment. The Peak Thresholding and Tracking algorithm 204 of FIG. 2 addresses this issue by observing peaks and determining which are significant interferers.

Figure 9A:
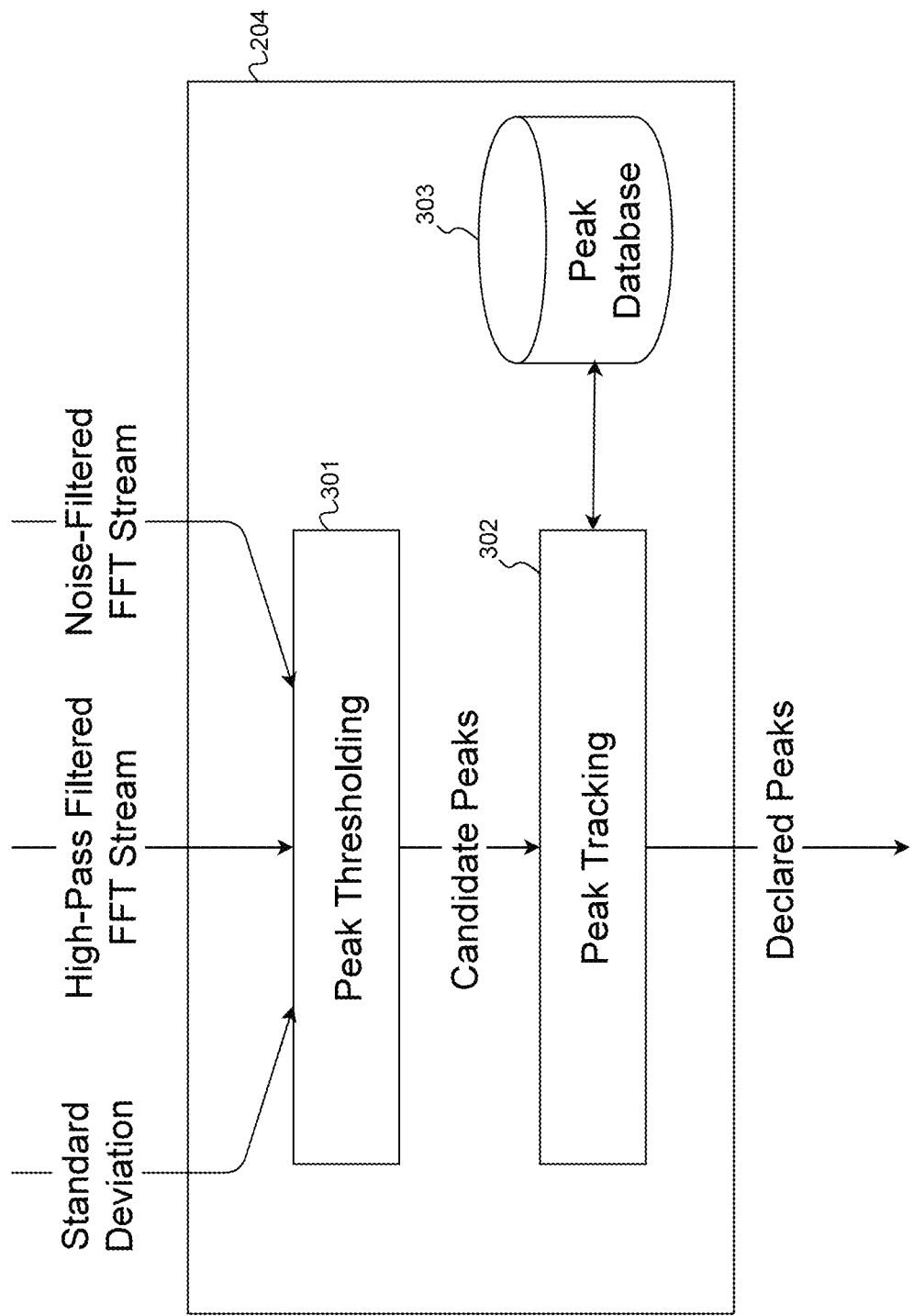
FIG. 9A is a flow chart showing main steps of an example embodiment of the peak tracking algorithm.

FIG. 9A shows main steps of an example embodiment of the Peak Thresholding and Tracking algorithm 204 which is the last stage of the peak detection method of FIG. 2. It is made up of two stages. The first stage identifies candidate peaks and is referred to as Peak Thresholding 301. The candidate peaks are fed in the Peak Tracking stage 302 which tracks peaks in the Peak Database 303 to identify those that are persistent and that may constitute significant interferences (declared peaks).

Figure 10:
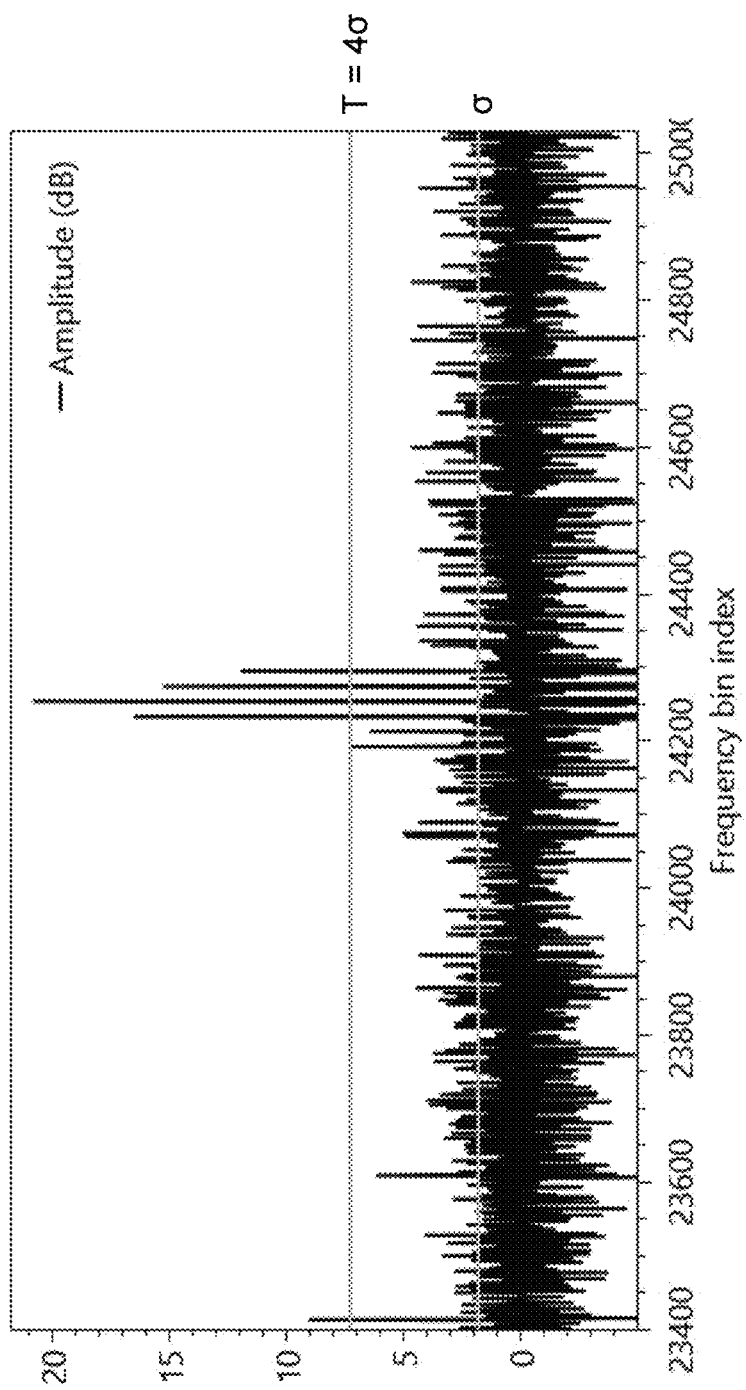
FIG. 10 is a graph which shows how the threshold is expressed as a multiple of the standard deviation.

The Peak Thresholding stage 301 requires the high-pass filtered FFT data, the noise-filtered FFT data and the standard deviation calculated on the filtered FFTs. A threshold is applied to the filtered FFTs data. The threshold T is the standard deviation multiplied by a certain factor. FIG. 10 shows a zoomed portion of a filtered FFT data with the corresponding standard deviation and an example factor of 4. The actual factor value depends on how sensitive the algorithm should be. In a monitoring environment where avoiding false positives is important, a factor of 6 to 10 is a good choice (power threshold is 6 to 10 times the standard deviation). When the algorithm is used as a visual aid for human-operated test equipment, it may be appropriate to lower this value for the factor to 4 to 6.

The noise-filtered FFT data coming from the noise filter stage 200 is necessary for Peak Thresholding stage 301. The candidate peaks are identified using high-pass filtered data that does not reflect the actual power of a peak. To obtain the actual power of a candidate peak, the algorithm looks up its value in the noise-filtered FFT data based on the FFT bin index.

Figure 11:
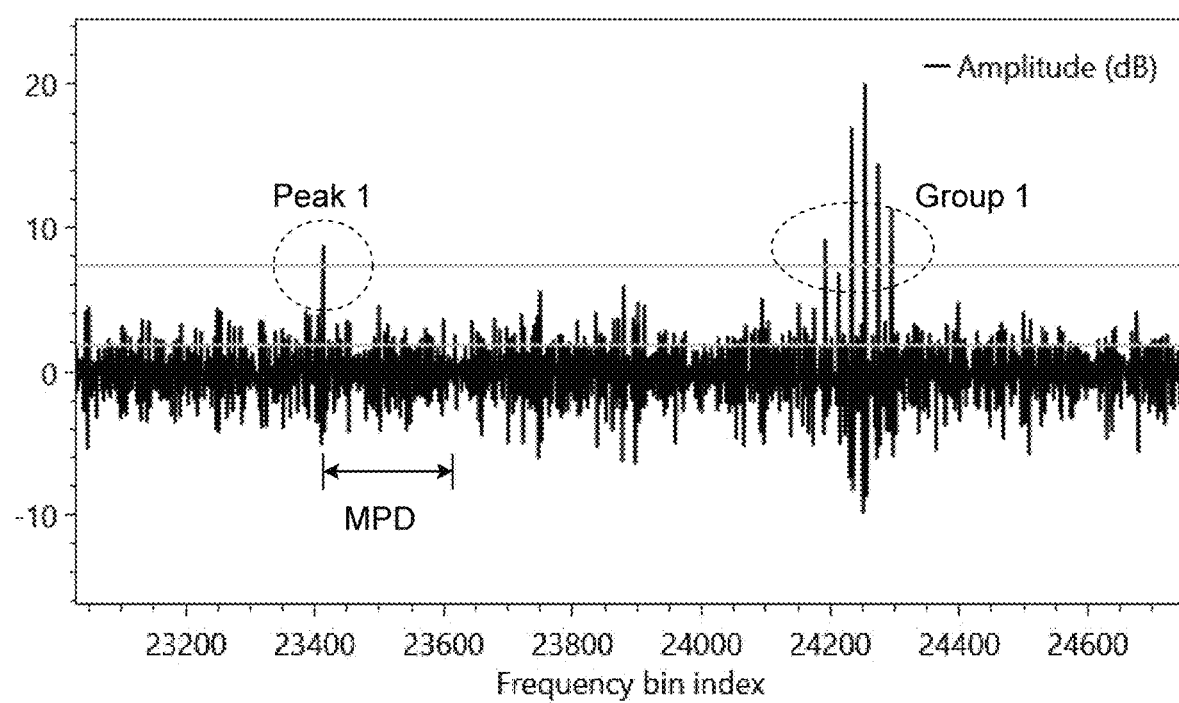
FIG. 11 is a graph which illustrates the purpose of the maximum peak distance parameter.

The Peak Thresholding stage 301 does not consider all threshold crossings as Peak Candidates because interferers can extend over a certain frequency range (e.g. FM modulation). When a power threshold crossing is found, the algorithm starts hunting for the limits of the peak. A maximum peak distance parameter MPD is used to determine when peaks are to be aggregated together. In FIG. 11, the multiple threshold crossings on the right labelled Group 1 are treated as one interferer whereas the crossing on the left labelled Peak 1 is considered a single interferer based on the maximum peak distance parameter MPD. Peak 1 and Group 1 are considered distinct peaks. The center frequency of the aggregated peaks of Group 1 is defined as the threshold crossing that has the highest power. The maximum peak distance parameter MPD should be selected with care. If it is too small, the thresholding stage may report too many candidate peaks which would be both inefficient and confusing for the user. If it is too large, too many peaks are aggregated together and we lose resolution. Values between 10 and 50 kHz have been found to give satisfying results. To apply the algorithm, this value is typically translated to a number of FFT bins. FIG. 11 shows a 32 kHz maximum peak distance that translates to 210 bins for a 32768-bins FFT over a 5 MHz bandwidth.

Figure 9B:
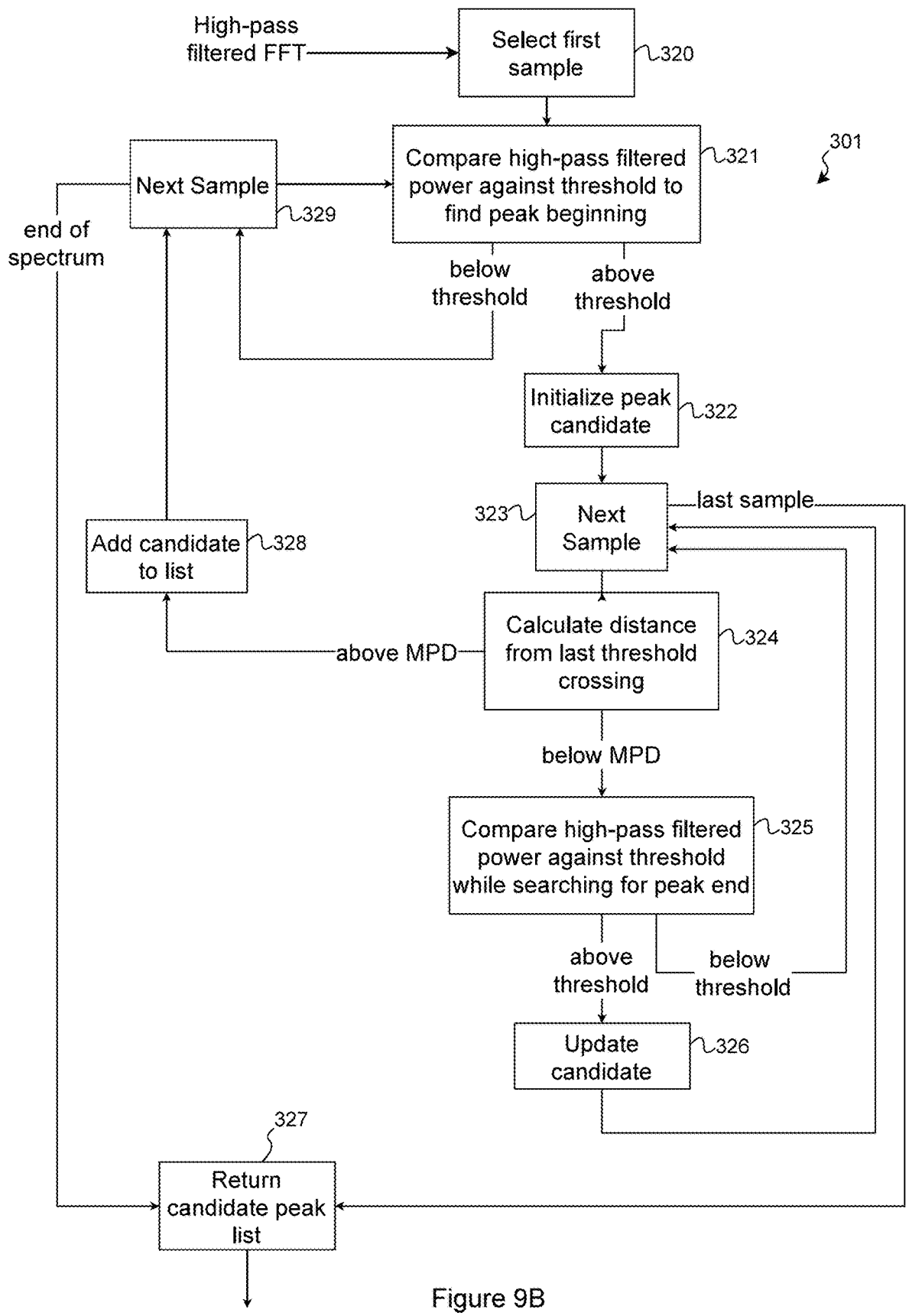
FIG. 9B is a flow chart showing main steps of an example embodiment of the peak thresholding algorithm and FIG. 9C is a flow chart showing main steps of an example embodiment of the peak tracking algorithm.

FIG. 9B provides an example implementation of the Peak Thresholding process 301. The FFTs provided by preceding stages are traversed from one end to another, the direction being non-critical. The algorithm selects a first sample 320 and compares its high-pass-filtered power against the threshold 321 to find the peak beginning. If the power is below the threshold, the algorithm proceeds to the next sample 329. If the power is above the threshold, the current sample is used to initialize a potential candidate peak 322. The algorithm will advance to the next sample 323 and calculate the distance from the last threshold crossing 324. If the distance is smaller than the maximum peak distance parameter MPD, the algorithm continues to compare the high-pass-filtered power against the threshold 325 while searching for the peak end. If the power is above the threshold, the potential candidate peak is updated 326 to correspond to the current sample. When the distance to the last threshold crossing 324 is greater than the maximum peak distance parameter MPD, the current potential candidate peak is added to the candidate list 328 and the algorithm begins hunting for the next peak, starting at the next sample 329. As soon as the algorithm has completely traversed the FFT, the list of candidate peak is returned 327.

Figure 12A:
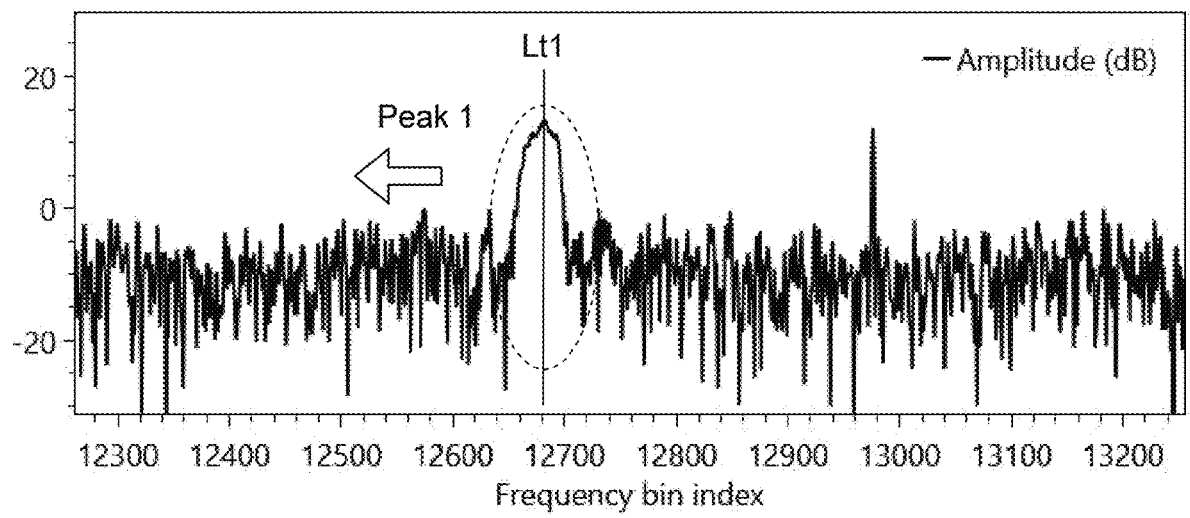
FIG. 12 includes FIG. 12A and FIG. 12B which show a moving peak being identified as the same peak because it is within the maximum peak movement parameter between two observations.
Figure 12B:
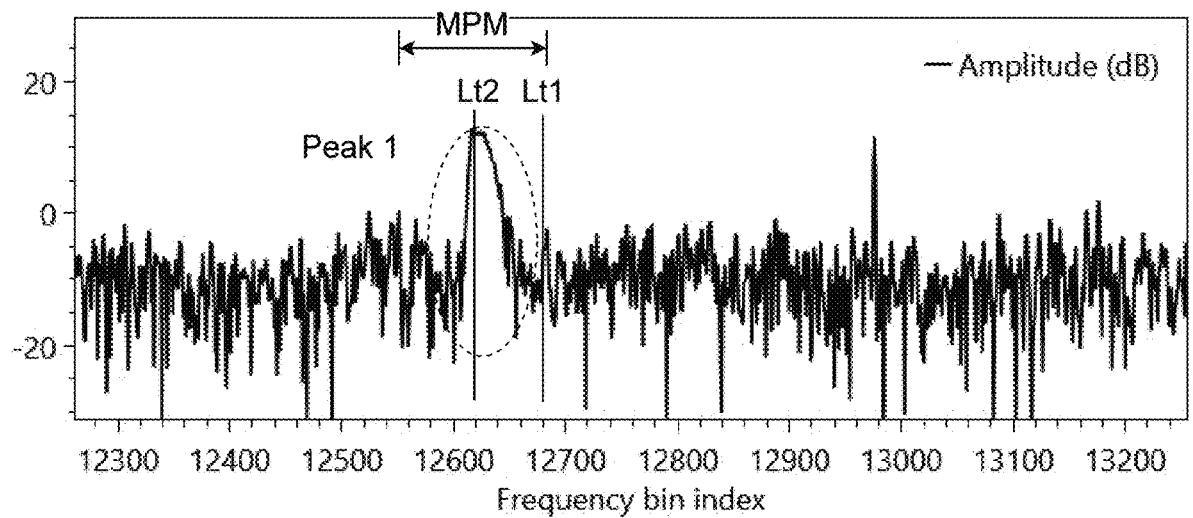

The candidate peaks are fed into the Peak Tracking stage 302. The list of candidates contains spurious peaks that do not persist in time. The peak tracking stage observes the status of candidate peaks over time to determine if they constitute significant interferers. From one list of candidates to the other, the peak may have moved in frequency. The peak tracker allows for a certain tolerance on the peak location when matching candidates to currently tracked peaks present in Peak Database 303. FIG. 12A and FIG. 12B show the location of a moving peak Peak 1 between two consecutive FFTs. Peak 1 has moved by about 60 bins in the direction of the arrow between its location at time t1 (Lt1) and its location at time t2 (Lt2), but since that distance is smaller than the maximum peak movement parameter MPM, the candidate peak at time t2 is matched to the corresponding tracked peak at time t1. The maximum peak movement parameter MPM is configurable. Its value is a tradeoff between the maximum speed at which a peak can move and the resolution of the peak detection. In an example embodiment it can be set to equal the maximum peak distance parameter MPD but other values can be used depending on the intended application.

The Peak Tracking stage 302 determines which peaks are sufficiently persistent in time to be declared as interferers. The process consists in maintaining for each tracked peaks a percentage of time where the peak is observed, then apply thresholds with a hysteresis to declare or clear an interferer. Optionally, the process may also take into account the power of the peak so that powerful candidate peaks get declared faster. The Peak Tracking stage 302 may be limited to only reporting the current interferers, but it can also maintain historical information in the Peak Database 303 for monitoring purpose.

In the described implementation, the peak tracker maintains a sliding window for the last N filtered FFTs. A value that is proportional to the power of the peak is pushed in the window whenever the peak is observed. The sum of values in the window is used to apply thresholds for declaring or clearing the presence of interferer. The power value is derived from the response of the high-pass filter. When a candidate peak is detected by the Peak Thresholding, the high-pass filter response for this peak is divided by the threshold. For instance, the value is close to 1 if the response is just above the threshold and close to 2 if the response is twice the threshold. A value of 0 is pushed into the window if the response is below the threshold. The exact calculation is not critical, but the important characteristic is that it is proportional to the power of the peak. This allows declaring powerful peaks faster.

The declare and clear thresholds are defined as multiples of the threshold used to detect candidate peaks. For instance, let T be the threshold used to detect peak candidate and M be the declare threshold. If the high-pass response for a detected peak is just above T, the sliding window contains values that are close to 1. The algorithm would declare that the detected peak is an interferer after being observed M times in the siding window. If the high-pass response is twice T, only M/2 observations are required.

Figure 13A:
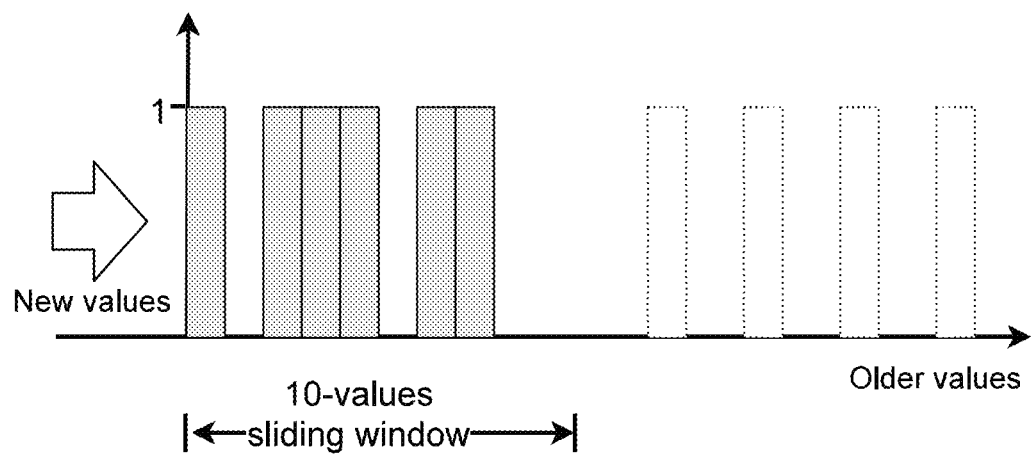
FIG. 13 includes FIG. 13A, FIG. 13B, FIG. 13C, FIG. 13D and shows four example 10-element sliding windows with a declare threshold M of 6 and a clear threshold N of 4.
Figure 13B:
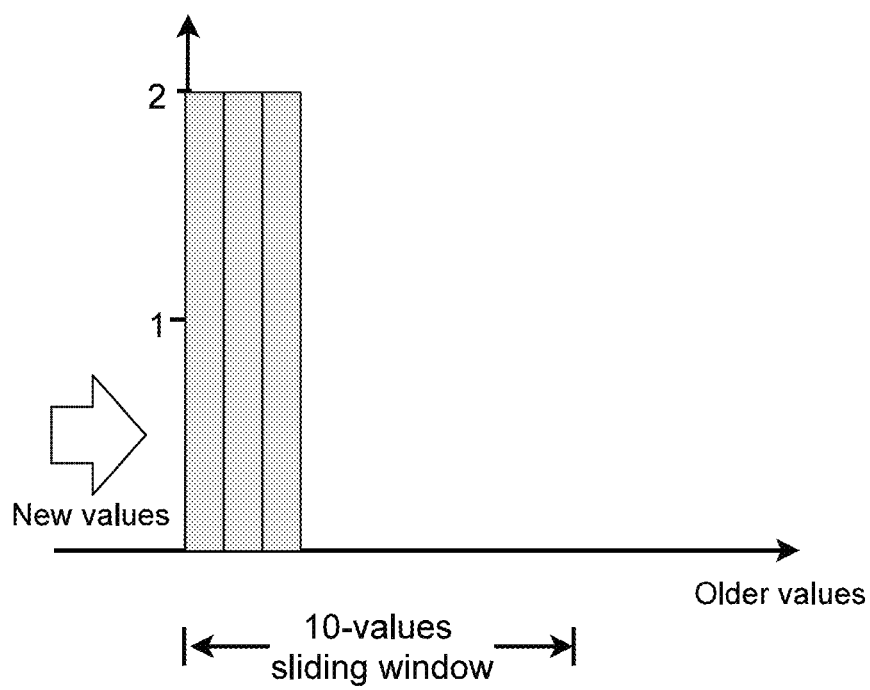
Figure 13C:
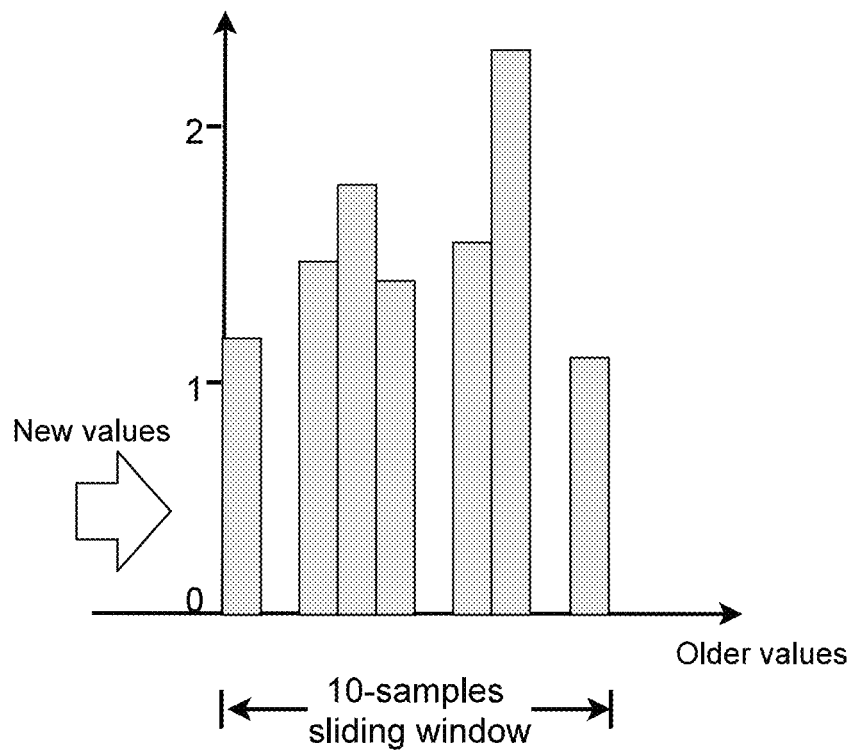
Figure 13D:
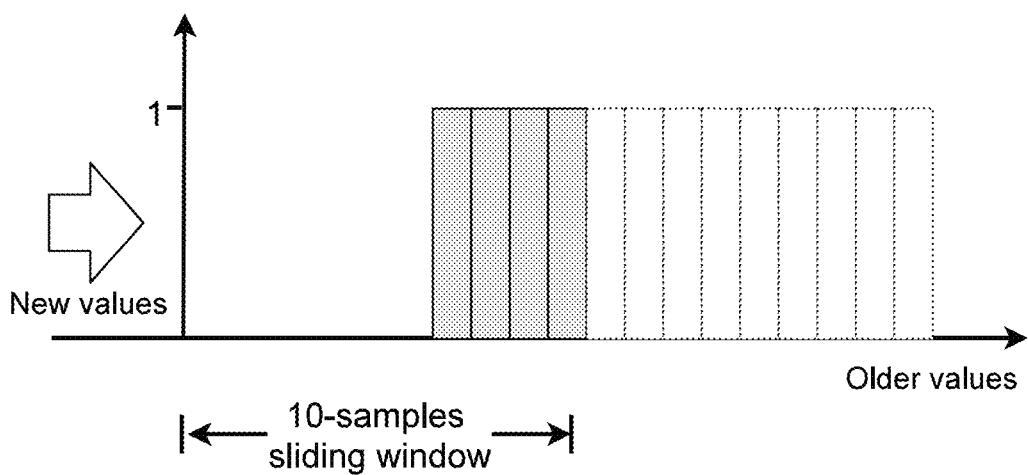

FIGS. 13A to 13D show states of a 10-element sliding window for different examples with a declare threshold M of 6 and a clear threshold N of 4. FIG. 13A shows the state of the window at the time a tracked peak changes to a declared state because it has been observed for a sixth times within the 10-element sliding windows, 6 times meeting the threshold T. Candidate peaks had been observed before but less than six times in the sliding window, as shown by the discarded values on the right of the window. In the example of FIG. 13B, the peak is declared twice as fast as in FIG. 13A because the threshold crossings are twice as powerful as the threshold. FIG. 13C shows another example of the state of the window where continuous power values are integrated to compare against the set threshold. Values of 0 are pushed in the window when the high-pass response is below the threshold. Finally, FIG. 13D shows another example of the state of the window where a steady interferer disappears. The corresponding tracked peak leaves the declared state when the accumulated normalized power falls below 4 which occurs 6 samples after the peak disappeared.

Figure 9C:
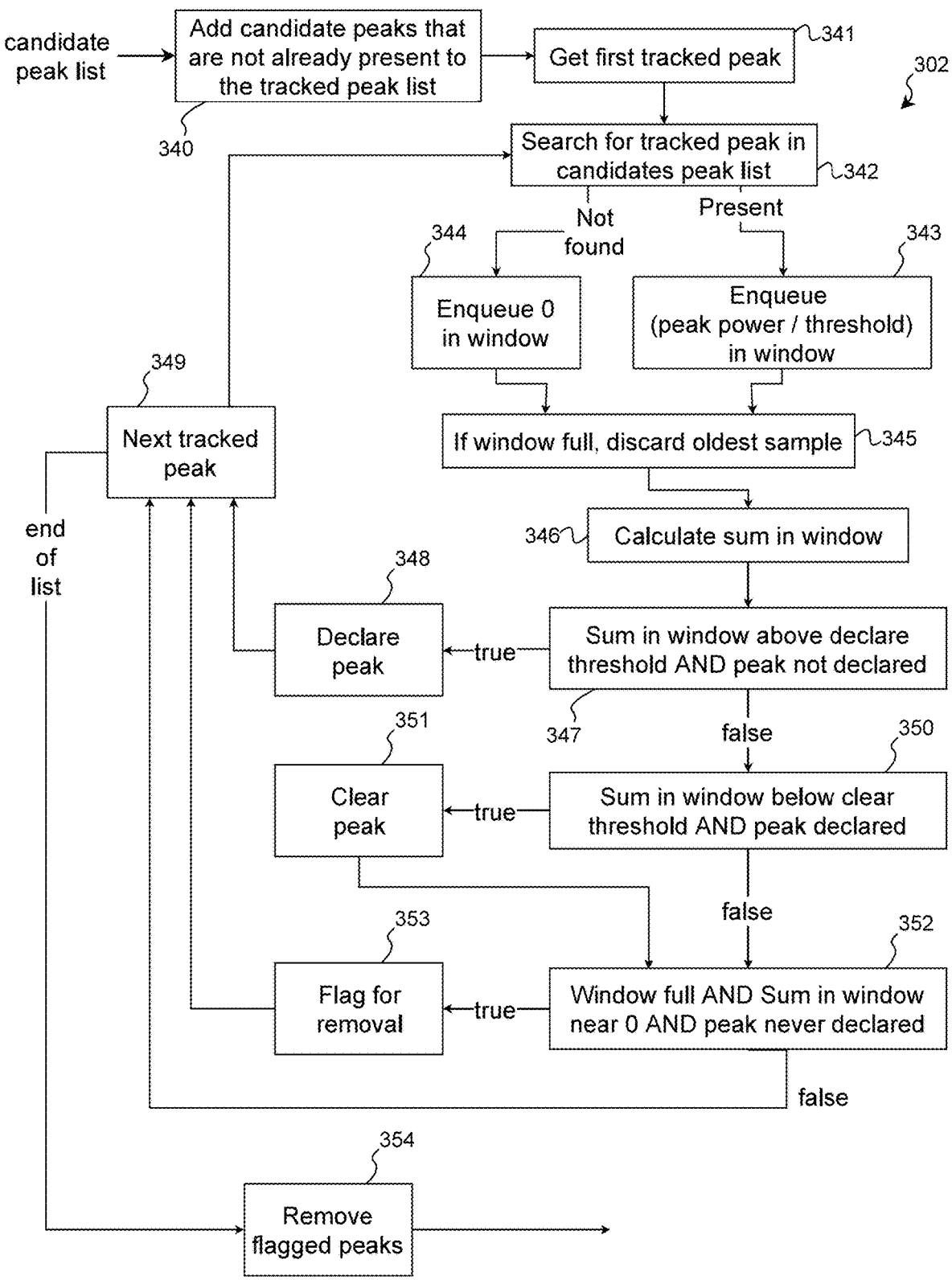

FIG. 9C shows a possible implementation of the Peak tracking stage 302. The algorithm operates on a succession of candidate lists and on a list of tracked peaks maintained in the Peak Database 303. The first step is to add all peaks from the candidate list that are not already present in the tracked peak list to the tracked peak list 340. At this stage, the maximum peak movement parameter MPM is used to match peaks together in order to account for peak movement. The algorithm starts iterating in the tracked peak list by getting the first tracked peak 341. The algorithm searches for this tracked peak in the candidate peak list 342, again using the maximum peak movement parameter MPM to match peaks. If the tracked peak is not found, it is not present or is not sufficiently powerful, and a value of 0 is enqueued 344 in the sliding window for that tracked peak. If the tracked peak is found, its power value divided by the threshold is enqueued in the sliding window 343. The algorithm then discards the oldest sample if the window is full 345 and calculates the sum of power in the sliding window 346. If the sum in the window is above the declare threshold and the peak is not in the declared state 347, the peak is declared 348 and the algorithm can proceed to the next tracked peak 349. If the sum is smaller than the declare threshold, the algorithm must assess if the peak must be cleared. If the sum is below the clear threshold and the peak is in the declared state 350, the peak is cleared 351. The algorithm also removes spurious peaks from the peak database by looking for a window sum close to 0. If the window is full (i.e. all its slots have values), and if the sum is near zero, and if the peak has never reached the declared state 352, the peak is flagged for removal 353. The algorithm proceeds to the next tracked peak 349. When the end of the list is reached, the algorithm removes the peaks flagged for removal 354 and returns the updated tracked peak list.

Figure 14A:
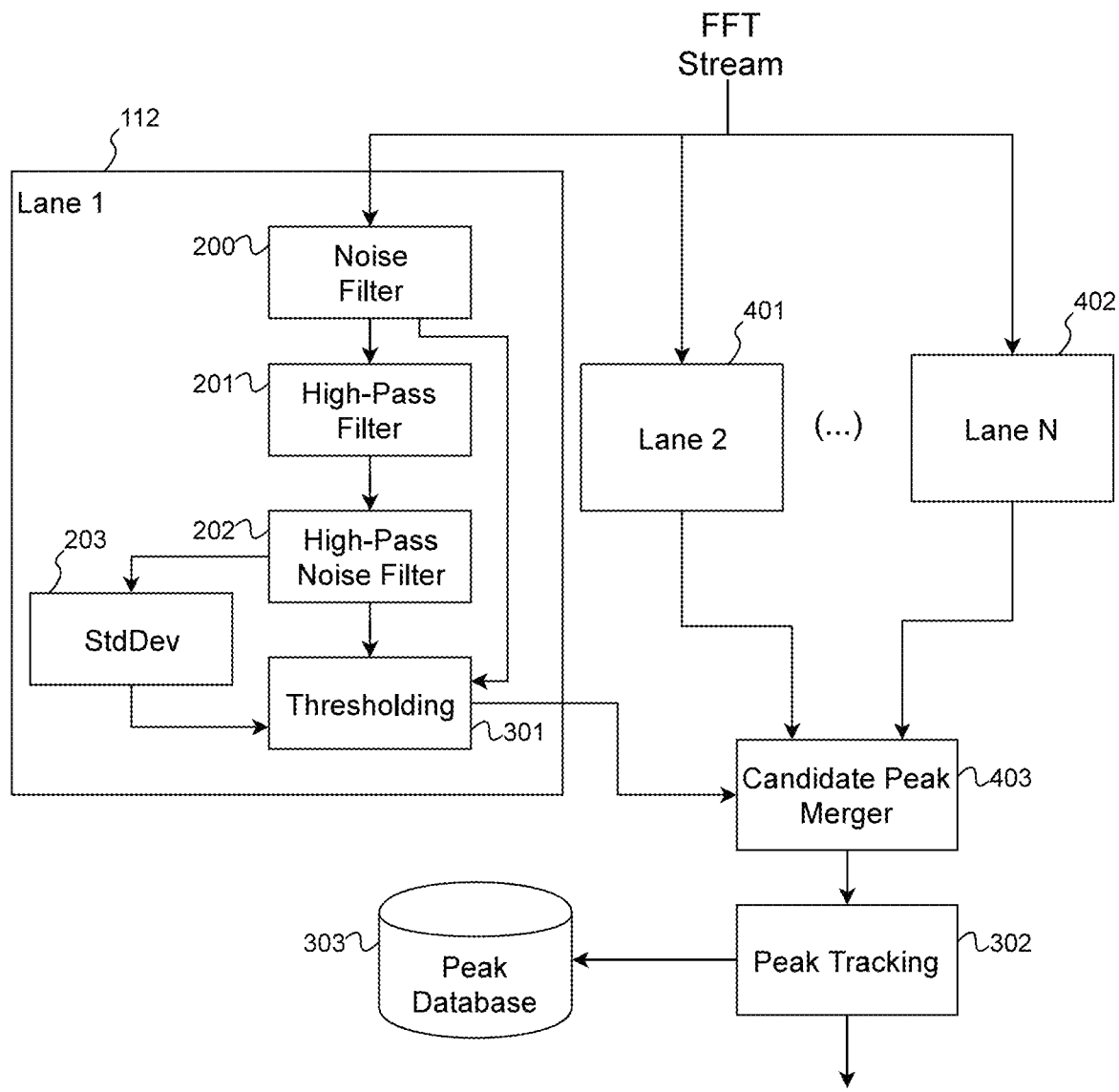
FIG. 14A is a flow chart showing example steps of a multi-lane peak tracking algorithm and FIG. 14B is a flow chart showing example steps of the candidate peak merger algorithm.

The performance of the peak detection process is dependent on the filtering stage. It is typically not possible to cover all types of peaks with a single set of parameters for the filtering stages. In order to detect multiple peak types at the same time, the implementation described so far can be adapted; In an alternative embodiment shown in FIG. 14A, the filtering stage splits the processing in multiple lanes (112, 401 and 402). Each lane is tuned to recognize a certain type of peak through specific parameters for the noise filter stage 200 and the post high-pass noise filtering stage 202, the high-pass filter 201 and Peak Thresholding 301. Even then, powerful peaks will often be detected by multiple lanes. The candidate peaks from each lane are fed into a Candidate Peak Merger 403 that is inserted between Peak Thresholding 301 and Peak tracking 302. The merger is necessary to identify duplicate candidate peaks and remove them from the merged list. Once a merged candidate peak list is obtained, the peak tracking algorithm operates in the same way as for the single-lane implementation.

Figure 14B:
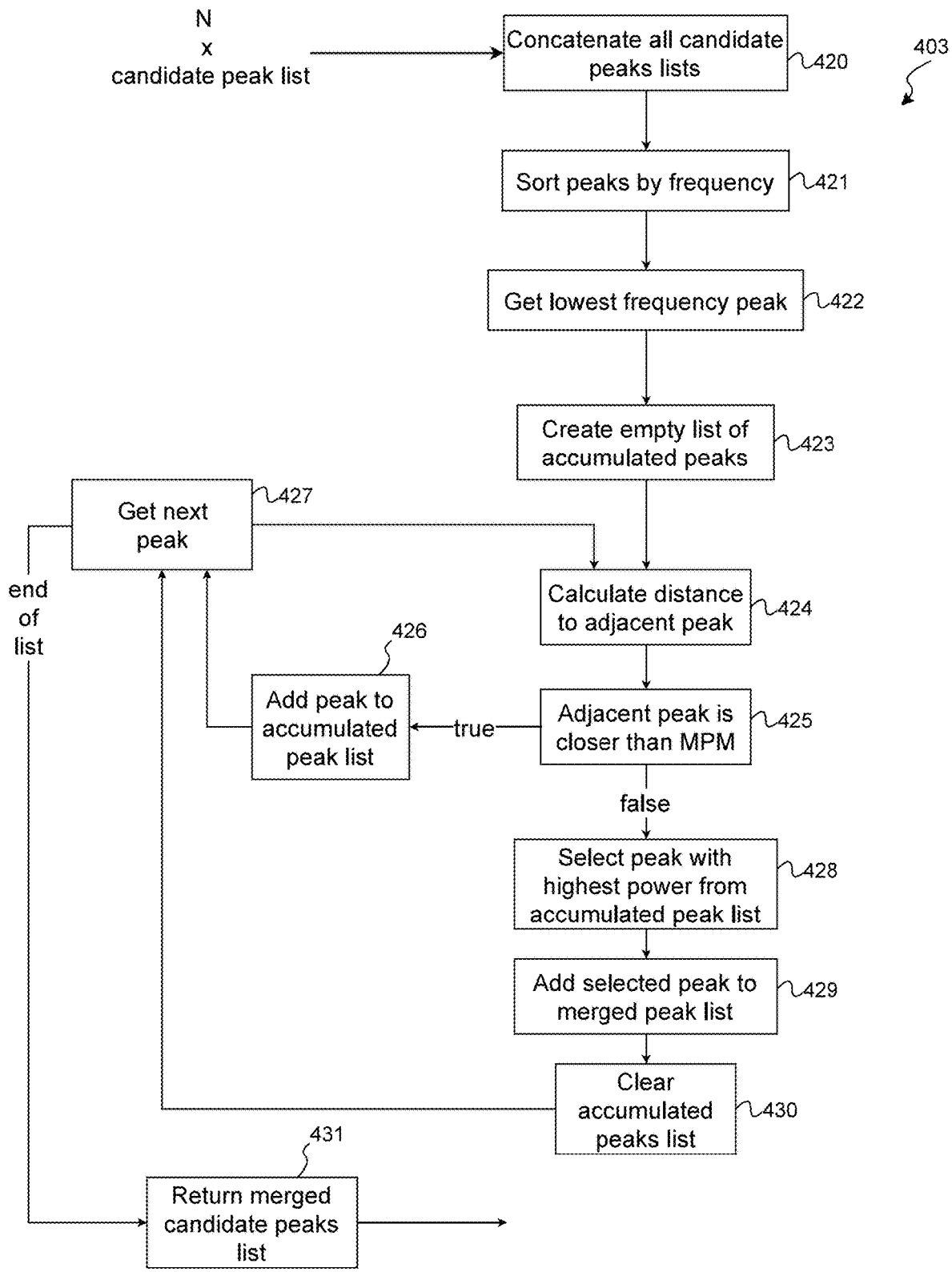

A possible implementation for the Candidate Peak Merger 403 is shown in FIG. 14B. The algorithm operates on N different lists of candidate peaks obtained from the various N filter lanes. The first step is to concatenate all candidate peak lists 420 into a single list. This list is then sorted by frequency 421. The algorithm traverses this list starting with the lowest frequency peak 422. An empty list of accumulated peaks is created 423. The algorithm calculates the distance to the adjacent peak in the list 424. If the adjacent peak is closer than the maximum peak movement parameter MPM 425, the adjacent peak will be merged with the current one by adding it to the accumulated peak list 426. The algorithm then proceeds with the next peak 427. If the distance to the adjacent peak is larger than maximum peak movement parameter MPM, the algorithm has finished rounding up a first group of peaks to be merged. It selects the peak with the highest power from the accumulated peak list 428; this peak will represent the group of peaks from all lists. The selected peak is added the merge peak list 429. The accumulated peak list is cleared 430 to continue processing with the next group of peaks starting at the next peak 427. When the algorithm reaches the end of the concatenated list, the merge is complete and it can return the merged candidate peak list 431.

Table 1 lists one possible set of parameters for the filter lanes that covers narrow to relatively wide peaks.

TABLE 1

Filter Lane Configuration

| | Filter 1 (narrow) | Filter 2 | Filter 3 | Filter 4 (wide) |
|---|---|---|---|---|
| Average 1$^{st}$ stage | | 4 | | |
| Sigma | 1 | 4 | 8 | 40 |
| Symmetry sigma | NA | 2 | 2 | 2 |
| Average 2$^{nd}$ stage | | 4 | | |
| Threshold | 5 | 5 | 5 | 9 |
| Max peak distance | 5 kHz | | | |

The parameters used for peak tracking are listed in Table 2.

TABLE 2

Peak Tracking Configuration

| | |
|---|---|
| Max Peak Movement | 5 kHz |
| Sliding window | 10 |
| Declare Threshold | 6 |
| Clear Threshold | 4 |

The extensive list of parameters for filter lanes and peak tracking configuration makes it complicated to adjust the overall sensitivity of the peak detection algorithm. One approach is to tune sets of parameters for various sensitivity levels. A simpler approach that works equally well is to apply a sensitivity factor to the threshold parameters of the filter lanes. Values ranging from 0.8 to 2 provide a good gradation from highly sensitive (and subject to false-positive) to sensitive only to the most obvious powerful peaks.

The steps of an example embodiment of the peak detection method for a RF spectrum including a plurality of raw FFTs can be summarized as follows: noise filtering a set of the raw FFTs of the RF spectrum into averaged FFTs to reduce the level of noise and emphasize at least one interference; Filtering the averaged FFTs with a high-pass filter to remove the low frequency components of the RF spectrum, thereby producing a high-pass filtered FFT; Averaging the high-pass filtered FFT to further reduce noise after the filtering stage; Calculating the standard deviation of the high-pass filtered FFT; Applying a power threshold on the high-pass filtered FFT to select at least one candidate peak having a power greater than the power threshold and with a peak width smaller than a maximum peak distance parameter, the threshold being a multiple of the standard deviation, the at least one candidate peak being the at least one interference; Repeating the steps of averaging, filtering, noise filtering, calculating and applying for a next set of raw FFTs of the RF spectrum; Tracking a presence of a tracked peak in the at least one candidate peak of at least two sets of raw FFTs; Accumulating the power of the tracked peak; Identifying a status of the tracked peak as declared if the accumulated power is greater than a declare threshold; Outputting information about the at least one tracked peak.

In another example embodiment, the steps of an interference detection method for providing information about at least one interference in I/Q data can be summarized as follows. The I/Q data is obtained over-the-air or detected on a link between a radio equipment controller (REC) and at least one radio equipment (RE). The I/Q data is provided as a plurality of FFTs, the interference causing a peak in the FFTs. The method comprises noise filtering a set of the FFTs into an averaged FFT; filtering the averaged FFT with a high-pass filter to remove low frequency components, thereby producing a high-pass filtered FFT; applying a power threshold on the high-pass filtered FFT to select at least one candidate peak having a power greater than the power threshold; outputting information about the at least one candidate peak, wherein the at least one candidate peak is a potential interference.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An interference detection method for providing information about at least one interference in I/Q data obtained over-the-air or detected on a link between a radio equipment controller (REC) and at least one radio equipment (RE), said I/Q data being provided as a plurality of Fast Fourier Transformation (FFT) streams, said interference causing a peak in said FFT streams the method comprising:
   noise filtering a set of said FFT streams into an averaged FFT;
   filtering the averaged FFT with a high-pass filter to remove low frequency components, thereby producing a high-pass filtered FFT;
   applying a power threshold on the high-pass filtered FFT to select at least one candidate peak having a power greater than said power threshold;
   outputting information about said at least one candidate peak, wherein said at least one candidate peak is a potential interference.

2. The interference detection method as claimed in claim 1, further comprising post high-pass noise filtering said high-pass filtered FFT after said filtering stage.

3. The interference detection method as claimed in claim 1, further comprising calculating a standard deviation of the high-pass filtered FFT and wherein said power threshold is a multiple of said standard deviation.

4. The interference detection method as claimed in claim 1, further comprising:
   splitting said filtering into multiple parallel filtering sub-stages, each filtering sub-stage of said multiple parallel filtering sub-stages being tuned differently to create a plurality of different high-pass filters;
   applying said power threshold in each of said multiple parallel filtering sub-stages to obtain a plurality of candidate peak lists;
   merging said plurality of candidate peak lists in a candidate peak merger.

5. The interference detection method as claimed in claim 1, wherein said filtering the averaged FFT with said high-pass filter further comprises applying a symmetry factor related to a symmetry of said at least one candidate peak thereby compensating for a power shift.

6. The interference detection method as claimed in claim 1, further comprising grouping ones of said at least one candidate peak into a grouped peak if said ones are separated by less than a maximum peak distance parameter.

7. The interference detection method as claimed in claim 1, further comprising
   repeating said steps of noise filtering, filtering and applying said power threshold for a next set of said FFT streams;
   tracking a presence of a tracked peak in said at least one candidate peak of said set and said next set to obtain a tracked peak;
   outputting information about said tracked peak.

8. The interference detection method as claimed in claim 7, wherein said tracking includes using a maximum peak movement parameter to match said at least one candidate peak of said set and said next set.

9. The interference detection method as claimed in claim 7, further comprising:
   accumulating said power of said tracked peak from said set of FFT streams and said next set of FFT streams into an accumulated power;
   identifying a status of said tracked peak as declared if said accumulated power is greater than a declare threshold;
   wherein said outputting information about said tracked peak further comprises outputting said status of said tracked peak.

10. The interference detection method as claimed in claim 9, further comprising calculating the standard deviation of the high-pass filtered FFT and wherein said declare threshold is a multiple of said standard deviation.

11. The interference detection method as claimed in claim 9, further comprising identifying said status of said tracked peak as clear if said accumulated power is smaller than a clear threshold, wherein said declare threshold is greater than said clear threshold.

12. The interference detection method as claimed in claim 11, further comprising calculating the standard deviation of the high-pass filtered FFT and wherein said clear threshold is a multiple of said standard deviation.

13. The interference detection method as claimed in claim 7, wherein said tracking said presence further comprises merging adjacent tracked peaks if said tracked peaks are closer than said maximum peak movement parameter by selecting a highest powered tracked peak.

14. A non-transitory computer-readable storage medium having computer readable code stored thereon for programming a test system to perform the steps of:
   obtaining I/Q data;
   processing the I/Q data to detect interferences according to claim 1;
   causing display of a user interface that includes a reporting of said interferences.

15. A test system comprising:
   a detector configured to obtain I/Q data;
   a processor; and
   memory storing instructions that, when executed, cause the processor to carry out the steps of claim 1.

* * * * *